US012224930B2

(12) United States Patent
Liu et al.

(10) Patent No.: US 12,224,930 B2
(45) Date of Patent: Feb. 11, 2025

(54) ESTABLISHMENT OF METHOD AND APPARATUS FOR IMPLEMENTING ENTRY BACKUP

(71) Applicant: HUAWEI TECHNOLOGIES CO., LTD., Guangdong (CN)

(72) Inventors: Jun Liu, Beijing (CN); Yaokun Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 536 days.

(21) Appl. No.: 17/562,101

(22) Filed: Dec. 27, 2021

(65) Prior Publication Data

US 2022/0124024 A1 Apr. 21, 2022

Related U.S. Application Data

(63) Continuation of application No. PCT/CN2020/083018, filed on Apr. 2, 2020.

(30) Foreign Application Priority Data

Jun. 28, 2019 (CN) ......................... 201910579797.8

(51) Int. Cl.
*H04L 45/00* (2022.01)
*H04L 45/02* (2022.01)
(Continued)

(52) U.S. Cl.
CPC .............. *H04L 45/22* (2013.01); *H04L 45/02* (2013.01); *H04L 45/28* (2013.01); *H04L 45/42* (2013.01)

(58) Field of Classification Search
None
See application file for complete search history.

(56) References Cited

U.S. PATENT DOCUMENTS 8,948,055 B2 2/2015 Bragg
9,019,814 B1 4/2015 Mohanty et al.
(Continued)

FOREIGN PATENT DOCUMENTS

CN 103001868 A 3/2013
CN 106059924 A 10/2016
(Continued)

OTHER PUBLICATIONS

Japanese Notice of Reasons for Rejection for Application No. 2021-577090 dated Mar. 14, 2023, 8 pages.
(Continued)

*Primary Examiner* — Otis L Thompson, Jr.

(57) ABSTRACT

This application discloses a method and apparatus for implementing entry backup. When a first network device needs to back up information about a first entry stored in the first network device to a second network device, the first network device generates a first BGP message that includes first entry information, and sends the first BGP message to the second network device, where the first BGP message is used to advertise a newly defined entry backup route to the second network device, or the first BGP message includes an extended community attribute. After receiving the first BGP message, the second network device may obtain a second entry based on the first BGP message, and store information about the second entry, where the second entry is a backup entry of the first entry.

17 Claims, 10 Drawing Sheets

301

A first network device generates a first BGP message, where the first BGP message includes first entry information, the first BGP message is used to advertise an entry backup route to a second network device, and the first entry information is information about a first entry stored in the first network device

302

The first network device sends the first BGP message to the second network device, where the first BGP message is used to advertise the entry backup route to the second network device

303

The second network device receives the first BGP message sent by the first network device

304

The second network device obtains a second entry based on the first BGP message, and stores information about the second entry, where the information about the second entry includes the first entry information, to back up the first entry on the second network device

(51) Int. Cl.
*H04L 45/28* (2022.01)
*H04L 45/42* (2022.01)

(56) References Cited

U.S. PATENT DOCUMENTS

| | | | | |
|---|---|---|---|---|
| 9,124,511 | B2 * | 9/2015 | Olofsson | H04L 45/28 |
| 9,344,359 | B1 * | 5/2016 | Tiruveedhula | H04L 45/16 |
| 10,164,876 | B2 | 12/2018 | Kanjariya et al. | |
| 2004/0008700 | A1 * | 1/2004 | Visser | H04L 45/00 370/401 |
| 2004/0174887 | A1 * | 9/2004 | Lee | H04L 12/4645 370/395.53 |
| 2005/0174989 | A1 | 8/2005 | Chen et al. | |
| 2006/0233181 | A1 * | 10/2006 | Raszuk | H04L 45/033 370/401 |
| 2007/0162614 | A1 * | 7/2007 | Patel | H04L 45/28 709/239 |
| 2014/0126422 | A1 * | 5/2014 | Bragg | H04L 12/462 370/255 |
| 2016/0191374 | A1 * | 6/2016 | Singh | H04L 45/22 370/228 |
| 2016/0261487 | A1 * | 9/2016 | Singh | H04L 45/70 |
| 2018/0013674 | A1 * | 1/2018 | Nainar | G06F 9/455 |
| 2018/0343199 | A1 | 11/2018 | Zeng et al. | |
| 2018/0375763 | A1 | 12/2018 | Brissette et al. | |
| 2019/0149456 | A1 * | 5/2019 | Brissette | H04L 12/4641 370/225 |
| 2020/0067812 | A1 * | 2/2020 | Malhotra | H04L 45/745 |

FOREIGN PATENT DOCUMENTS

| | | | |
|---|---|---|---|
| CN | 106411728 | A | 2/2017 |
| CN | 106712997 | A | 5/2017 |
| CN | 107222449 | A | 9/2017 |
| CN | 107846342 | A | 3/2018 |
| CN | 107948041 | A | 4/2018 |
| CN | 108574614 | A | 9/2018 |
| CN | 109218178 | A | 1/2019 |
| EP | 3151485 | A1 | 4/2017 |
| JP | 2013526813 | A | 6/2013 |

OTHER PUBLICATIONS

Shohei Kamamura et al, OSPF and BGP State Migration for Resource-portable IP Router, 2015 IEEE Global Communications Conference (GLOBECOM), Feb. 25, 2016, 6 pages.
Sajassi A et al, BGP MPLS-Based Ethernet VPN; rfc7432.txt, BGP MPLS-Based Ethernet VPN; RFC7432. TXT, Internet Engineering Task Force, IETF; Standard, Internet Society (ISOC) 4, Rue Des Falaises CH—1205 Geneva, Switzerland, Feb. 18, 2015 (Feb. 18, 2015), pp. 1-56, XP015104549.
Li Yangchun et al., A Centralized Backup Technology for Distributed CGN, Telecommunications Science, 2014, Issue Z2, 10 pages.
Lixin Gao et al, Inherently safe backup routing with BGP, Proceedings IEEE Infocom 2001. Conference on Computer Communications. Twentieth Annual Joint Conference of the IEEE Computer and Communications Society (Cat. No. 01CH37213); [Proceedings IEEE Infocom. The Conference on Computer Communications], PISCAT, vol. 1, Apr. 22, 2001 (Apr. 22, 2001), pp. 547-556, XP010538736.
Chinese Notice of Allowance for Application No. 202011058157 dated Oct. 11, 2021, 2 pages.
Chinese Office Action for Application No. 201910579797 dated Apr. 21, 2021, 18 pages.
European Patent Office Extended Search Report for Application No. 20831009.4 dated Jun. 9, 2022, 11 pages.
PCT Search Report for PCT/CN2020/083018 dated Apr. 2, 2020, 10 pages.

* cited by examiner

| Type (Type) (1 byte) |
|---|
| Length (Length) (1 byte) |
| Route distinguisher (Route Distinguisher) (8 bytes) |
| Ethernet segment identifier (Ethernet Segment Identifier) (10 bytes) |
| Ethernet tag identifier (Ethernet Tag ID) (4 bytes) |
| MAC address length (1 byte) |
| MAC address (6 bytes) |
| IP address length (1 byte) |
| IP address (4 or 16 bytes) |
| Lease (Lease) (6 bytes) |
| Originating router's IP address (4 or16 bytes) |

FIG. 5

| Year (year) | | | Month (month) | Day (day) | Hour (hour) |
|---|---|---|---|---|---|
| Minute (minute) | Second (second) | Reserve (reserve) | | | |

FIG. 6

| Type (Type) (1 byte) |
|---|
| Length (Length) (1 byte) |
| Route distinguisher (Route Distinguisher) (8 bytes) |
| Ethernet segment identifier (Ethernet Segment Identifier) (10 bytes) |
| Ethernet tag identifier (Ethernet Tag ID) (4 bytes) |
| MAC address length (1 byte) |
| MAC address (6 bytes) |
| IP address length (1 byte) |
| IP address (4 or 16 bytes) |
| Originating router's IP address (4 or 16 bytes) |

FIG. 7

<table>
<tr><td colspan="2">Extend community type (Extend Community type)</td><td colspan="2">Extend community sub-type (Extend Community sub-type)</td><td colspan="3">Year (year)</td></tr>
<tr><td>Month (month)</td><td colspan="2">Day (day)</td><td>Hour (hour)</td><td>Minute (minute)</td><td>Second (second)</td><td>Reserve (reserve)</td></tr>
</table>

FIG. 8

| BGP address family | AFI | SAFI |
|---|---|---|
| IPv4 BGP backup address family | 1 | X |
| IPv6 BGP backup address family | 2 | Y |

FIG. 9

| Route type (Route Type) (1 byte) |
|---|
| Length (Length) (1 byte) |
| Backup identifier (Backup ID) (2 bytes) |
| Ethernet tag identifier (Ethernet Tag ID) (4 bytes) |
| MAC address length (1 byte) |
| MAC address (6 bytes) |
| IP address length (1 byte) |
| IP address (4 or 16 bytes) |
| Originating router's IP address (4 or 16 bytes) |
| Lease (Lease) (6 bytes) |

FIG. 10

| Route type (Route Type) (1 byte) |
|---|
| Length (Length) (1 byte) |
| Backup identifier (Backup ID) (2 bytes) |
| Ethernet tag identifier (Ethernet Tag ID) (4 bytes) |
| MAC address length (1 byte) |
| MAC address (6 bytes) |
| IP address length (1 byte) |
| IP address (4 or 16 bytes) |
| Originating router's IP address (4 or 16 bytes) |

FIG. 11

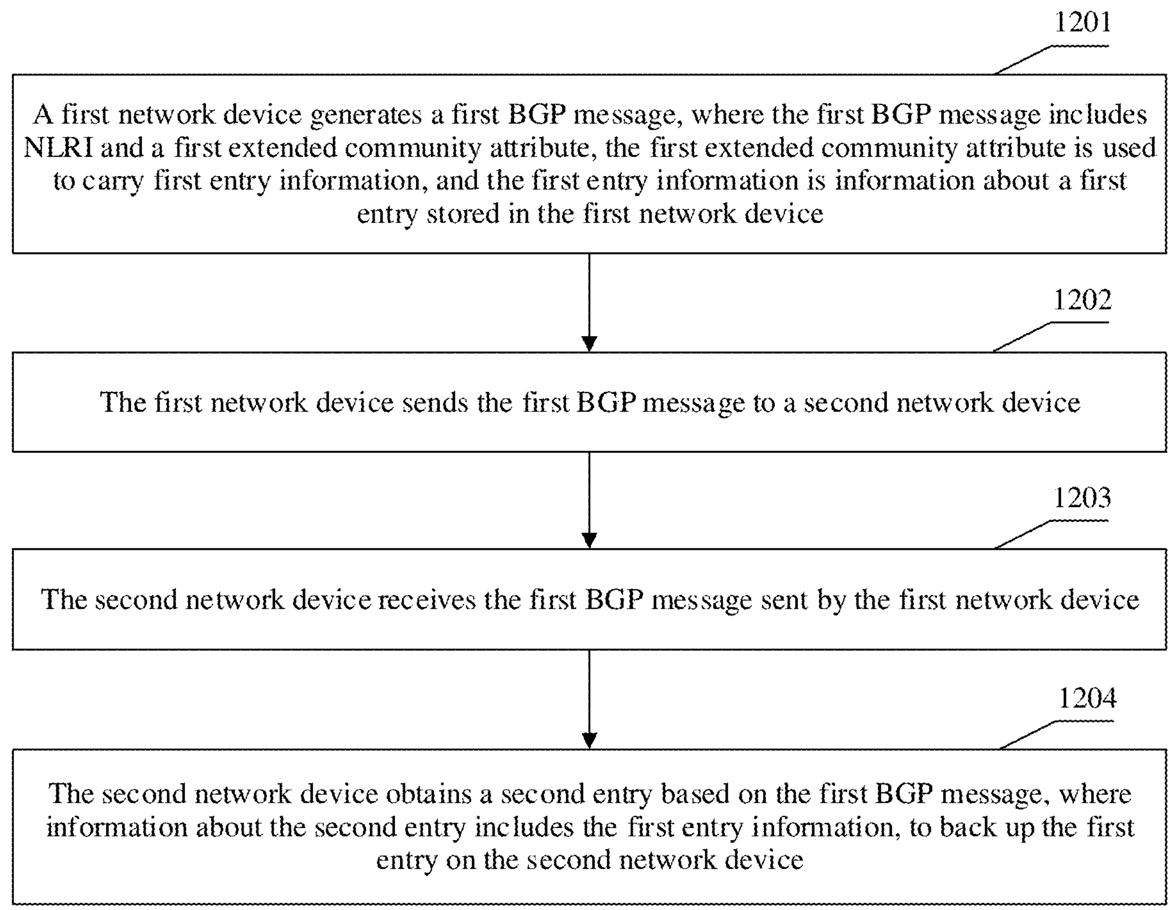

FIG. 12

<table>
<tr><td>Extend community type<br>(Extend Community type)</td><td colspan="2">Extend community sub-type<br>(Extend Community sub-type)</td><td>Backup identifier<br>(backup_id)</td></tr>
<tr><td colspan="2">Outer virtual local area network<br>(Outer vlan)</td><td colspan="2">Inner virtual local area network<br>(Inner vlan)</td></tr>
</table>

FIG. 13

<table>
<tr><td>Extend community type<br>(Extend Community type)</td><td>Extend community sub-type<br>(Extend Community sub-type)</td><td></td></tr>
<tr><td colspan="3">MAC address<br>(MAC address)</td></tr>
</table>

FIG. 14

ESTABLISHMENT OF METHOD AND APPARATUS FOR IMPLEMENTING ENTRY BACKUP

CROSS-REFERENCE TO RELATED APPLICATIONS

This application is a continuation of International Application No. PCT/CN2020/083018, filed on Apr. 2, 2020, which claims priority to Chinese Patent Application No. 201910579797.8, filed on Jun. 28, 2019. The disclosures of the aforementioned applications are hereby incorporated by reference in their entireties.

TECHNICAL FIELD

This application relates to the field of communications technologies, and in particular, to a method and apparatus for implementing entry backup.

BACKGROUND

To improve network reliability, a multi-device backup manner is usually used to provide redundancy protection for a network. Multi-device backup is to back up an entry generated on an active network device to another standby network device. When the active network device is normal, the active network device provides a corresponding business service based on the entry on the active network device. Once the active network device is faulty, the standby network device is switched to a new active network device, and the new active network device provides a corresponding business service based on an entry backed up on the new active network device.

However, for network devices, data types of entries that need to be backed up to the standby network device are different because types of services carried by the network devices are different. For example, when a dynamic host configuration protocol snooping (Dynamic Host Configuration Protocol Snooping or DHCP SNP) service is carried, a DHCP SNP entry needs to be backed up on the standby network device. For another example, when an address resolution protocol (Address Resolution Protocol or ARP) service is carried, an ARP entry needs to be backed up on the standby network device.

Network devices of different vendors usually use their own proprietary protocols to back up entries between their own network devices. Based on this, a method for implementing entry backup urgently needs to be provided to overcome a problem that entry backup cannot be performed between the network devices of the different vendors, and therefore an effect of improving network reliability through dual-device backup cannot be achieved.

SUMMARY

Based on this, embodiments of this application provide a method and apparatus for implementing entry backup, to obtain a universal backup standard applicable to network devices by extending a border gateway protocol (Border Gateway Protocol or BGP), so that entry backup can be performed between network devices of different vendors, thereby improving network reliability.

According to a first aspect, an embodiment of this application provides a method for implementing entry backup. When a first network device needs to back up information (namely, first entry information) about a first entry stored in the first network device to a second network device, the first network device may generate a first border gateway protocol (BGP) message that includes the first entry information, and send the first BGP message to the second network device, where the first BGP message is used to advertise a newly defined entry backup route to the second network device. After receiving the first BGP message, the second network device may obtain a second entry based on the first BGP message, and store information about the second entry, where the information about the second entry includes the first entry information, thereby implementing an effect of backing up the first entry information on the second network device. It may be understood that the first BGP message includes a route type field, and the route type field indicates that a type of a route advertised by the first BGP message is the entry backup route.

It can be learned that a newly defined BGP route type, namely, the entry backup route, is extended in the method provided in this embodiment of this application. The entry backup route is applicable to network devices of various vendors. To be specific, network devices of different vendors may perform operations such as receiving, sending, and identifying the first BGP message that advertises the entry backup route, thereby overcoming a problem that entry backup between the network devices of the different vendors cannot be implemented by using proprietary protocols of the vendors to perform entry backup. The newly defined BGP route type that can be universally used by the network devices of the various vendors is provided, so that entry backup can be performed easily and conveniently between the network devices of the different vendors. Therefore, reliability of a network that includes the network devices of the different vendors can be improved in a multi-device backup manner.

With reference to a specific implementation of the first aspect, the first BGP message includes Ethernet virtual private network (EVPN) network layer reachability information (NLRI), the EVPN NLRI is used to carry an Ethernet segment identifier (ESI), the ESI is used by the second network device to obtain port information, and the second entry includes the port information.

With reference to another specific implementation of the first aspect, the first BGP message includes first NLRI and a newly defined subsequent address family identifier (SAFI), the SAFI indicates that an address family of the first BGP message is a BGP backup address family, the first NLRI is used to carry a backup interface identifier (backup_id), the backup_id is used by the second network device to obtain port information, and the second entry includes the port information.

In an example, the first entry is a dynamic host configuration protocol snooping (DHCP SNP) entry, the first entry information includes an internet protocol (IP) address, a media access control (MAC) address, and lease information, the first BGP message further includes a first extended community attribute, the NLRI includes the IP address and the MAC address, and the first extended community attribute includes the lease information. When duration of generating the first entry exceeds a valid lease indicated in the lease information, the first network device deletes the first entry, and generates a second BGP message, where the second BGP message is used to advertise a route for withdrawing the backup entry to the second network device; and the first network device sends the second BGP message to the second network device, where the second BGP message is used to indicate the second network device to delete the second entry.

With reference to still another specific implementation of the first aspect, the method further includes: When the first network device receives a go-offline request sent by user equipment, the first network device deletes the first entry, and generates a third BGP message, where the third BGP message is used to advertise a route for withdrawing the backup entry to the second network device; and the first network device sends the third BGP message to the second network device, where the third BGP message is used to indicate the second network device to delete the second entry. In this way, a service corresponding to the entry is brought offline, and resources on the network device are released.

With reference to yet another specific implementation of the first aspect, the method may further include: The first network device generates a fourth BGP message, where the fourth BGP message includes a second extended community attribute, and the second extended community attribute includes the first entry information; and the first network device sends the fourth BGP message to a third network device, to enable the third network device to obtain a third entry based on the fourth BGP message, where information about the third entry includes the first entry information, and the third entry is a backup entry of the first entry.

It should be understood that the fourth BGP message further includes a backup_id, the second extended community attribute includes the backup_id, the backup_id is used by the second network device to obtain port information, and the second entry includes the port information.

With reference to yet another specific implementation of the first aspect, the first entry information includes a MAC address, the fourth BGP message further includes a third extended community attribute, and the third extended community attribute includes the MAC address.

With reference to still another specific implementation of the first aspect, the first entry and the third entry are DHCP SNP entries, and the first entry information further includes lease information. In this case, the fourth BGP message further includes a fourth extended community attribute, and the fourth extended community attribute includes the lease information.

It should be understood that the first entry is an address resolution protocol (ARP) entry, a neighbor discovery protocol (NDP) entry, an internet group management protocol (IGMP) entry, an internet group management protocol snooping (IGMP SNP) entry, or a broadband access server (BAS) entry.

According to a second aspect, an embodiment of this application further provides another method for implementing entry backup, including: A second network device receives a first BGP message sent by a first network device, where the first BGP message includes first entry information, the first entry information is information about a first entry stored in the first network device, and the first BGP message is used to advertise an entry backup route to the second network device; and the second network device obtains a second entry based on the first BGP message, and stores information about the second entry, where the second entry is a backup entry of the first entry, and the information about the second entry includes the first entry information. The first BGP message includes a route type field, and the route type field indicates that a type of a route advertised by the first BGP message is the entry backup route.

With reference to a specific implementation of the second aspect, the first BGP message includes EVPN NLRI, the EVPN NLRI is used to carry an ESI, and the method further includes: The second network device obtains port information based on the ESI, where the second entry includes the port information.

With reference to still another specific implementation of the second aspect, the first BGP message includes first NLRI and a newly defined SAFI, the SAFI indicates that an address family of the first BGP message is a BGP backup address family, the first NLRI is used to carry a backup_id, and the method further includes: The second network device obtains port information based on the backup_id, where the second entry includes the port information.

With reference to yet another specific implementation of the second aspect, the first entry is a DHCP SNP entry, the first entry information includes an IP address, a MAC address, and lease information, and the first BGP message further includes a first extended community attribute. That the second network device obtains a second entry based on the first BGP message is specifically: The second network device obtains the second entry based on the IP address and the MAC address that are in the NLRI and the lease information included in the first extended community attribute.

With reference to still another specific implementation of the second aspect, the method further includes: When duration of generating the first entry exceeds a valid lease indicated in the lease information, the second network device receives a second BGP message sent by the first network device, where the second BGP message is used to advertise a route for withdrawing the backup entry to the second network device; and the second network device deletes the second entry based on the second BGP message.

With reference to yet another specific implementation of the second aspect, the method further includes: When the first network device receives a go-offline request sent by user equipment, the second network device receives a third BGP message sent by the first network device, where the third BGP message is used to advertise a route for withdrawing the backup entry to the second network device; and the second network device deletes the second entry based on the third BGP message.

With reference to still another specific implementation of the second aspect, the method further includes: The second network device receives a fourth BGP message sent by the first network device, where the fourth BGP message includes a second extended community attribute, and the second extended community attribute includes the first entry information; and the second network device obtains a third entry based on the fourth BGP message, where information about the third entry includes the first entry information, and the third entry is a backup entry of the first entry.

In an example, the fourth BGP message further includes a backup_id, the second extended community attribute includes the backup_id, and the method further includes: The second network device obtains port information based on the backup_id, where the second entry includes the port information.

With reference to still another specific implementation of the second aspect, the first entry information includes a MAC address, the fourth BGP message further includes a third extended community attribute, and the third extended community attribute includes the MAC address.

With reference to another specific implementation of the second aspect, the first entry is a DHCP SNP entry, and the first entry information further includes lease information. In this case, the fourth BGP message further includes a fourth extended community attribute, and the fourth extended community attribute includes the lease information.

With reference to still another specific implementation of the second aspect, the first entry is an ARP entry, a NDP entry, an IGMP entry, an IGMP SNP entry, or a BAS entry.

It should be noted that the method provided in the second aspect is a method corresponding to the method provided in the first aspect on a second network device side, and corresponds to the method provided in the first aspect. Therefore, for various possible implementations and technical effects of the method provided in the second aspect, refer to the description of the method provided in the first aspect.

According to a third aspect, an embodiment of this application further provides a method for implementing entry backup. When a first network device needs to back up information (namely, first entry information) about a first entry stored in the first network device to a second network device, the first network device may generate NLRI and a first BGP message of a first extended community attribute, and send the first BGP message to the second network device, where the first extended community attribute is used to carry the first entry information. After receiving the first BGP message, the second network device may obtain a second entry based on the first BGP message, and store information about the second entry, where the information about the second entry includes the first entry information, thereby implementing an effect of backing up the first entry information on the second network device.

It can be learned, in the method provided in this embodiment of this application, an extended community attribute is added to a BGP route. In the generated first BGP message, the newly added extended community attribute carries to-be-backed-up first entry information. A common BGP route is applicable to network devices of various vendors. To be specific, network devices of different vendors may perform operations such as receiving, sending, and identifying the first BGP message of the newly added extended community attribute, thereby overcoming a problem that entry backup between the network devices of the different vendors cannot be implemented by using proprietary protocols of the vendors to perform entry backup. The extended community attribute is added to the common BGP route that can be universally used by the network devices of the various vendors, so that entry backup can be performed easily and conveniently between the network devices of the different vendors. Therefore, reliability of a network that includes the network devices of the different vendors can be improved in a multi-device backup manner.

With reference to a specific implementation of the third aspect, the first BGP message includes a backup_id, the first extended community attribute includes the backup_id, the backup_id is used by the second network device to obtain port information, and the second entry includes the port information.

With reference to still another specific implementation of the third aspect, the first entry information includes a MAC address, the first BGP message further includes a second extended community attribute, and the second extended community attribute includes the MAC address.

In an example, the first entry and the second entry are DHCP SNP entries, and the first entry information further includes lease information. In this case, the first BGP message further includes a third extended community attribute, and the third extended community attribute includes the lease information.

With reference to another specific implementation of the third aspect, the first entry is an ARP entry, a NDP entry, an IGMP entry, an IGMP SNP entry, or a BAS entry.

With reference to yet another specific implementation of the third aspect, the method further includes: When the first network device receives a go-offline request sent by user equipment, or when duration of generating the first entry exceeds a valid lease indicated in the lease information in the first entry information, the first network device deletes the first entry, and generates a second BGP message, where the second BGP message is used to advertise a route for withdrawing the backup entry to the second network device; and the first network device sends the second BGP message to the second network device, where the second BGP message is used to indicate the second network device to delete the second entry. In this way, a service corresponding to the entry is brought offline, and resources on the network device are released.

According to a fourth aspect, an embodiment of this application further provides a method for implementing entry backup. The method includes: A second network device receives a first BGP message sent by a first network device, where the first BGP message includes NLRI and a first extended community attribute, the first extended community attribute includes first entry information, and the first entry information is information about a first entry stored in the first network device; and the second network device obtains a second entry based on the first BGP message, and stores information about the second entry, where the information about the second entry includes the first entry information, to back up the first entry on the second network device, and the second entry is a backup entry of the first entry.

With reference to a specific implementation of the fourth aspect, the first BGP message includes a backup_id, the first extended community attribute includes the backup_id, and the method further includes: The second network device obtains port information based on the backup_id, where the second entry includes the port information.

It should be understood that the first entry information includes a MAC address, the first BGP message further includes a second extended community attribute, and the second extended community attribute includes the MAC address.

In an example, the first entry is a DHCP SNP entry, and the first entry information further includes lease information. In this case, the first BGP message further includes a third extended community attribute, and the third extended community attribute includes the lease information.

With reference to another specific implementation of the fourth aspect, the first entry is an ARP entry, a NDP entry, an IGMP entry, an IGMP SNP entry, or a BAS entry.

With reference to still another specific implementation of the fourth aspect, the method further includes: When the first network device receives a go-offline request sent by user equipment, or when duration of generating the first entry exceeds a valid lease indicated in the lease information in the first entry information, the second network device receives the second BGP message sent by the first network device, where the second BGP message is used by the first network device to advertise a route for withdrawing the backup entry to the second network device; and the second network device deletes the second entry based on the second BGP message.

It should be noted that the method provided in the fourth aspect is a method corresponding to the method provided in the third aspect on a second network device side, and corresponds to the method provided in the third aspect. Therefore, for various possible implementations and technical effects of the method provided in the fourth aspect, refer to the description of the method provided in the third aspect.

According to a fifth aspect, an embodiment of this application further provides an apparatus for implementing entry backup, applied to a first network device, and including a first processing unit and a first sending unit.

The first processing unit is configured to generate a first BGP message, where the first BGP message includes first entry information, and the first entry information is information about a first entry stored in the first network device.

The first sending unit is configured to send the first BGP message to a second network device, where the first BGP message is used to advertise an entry backup route to the second network device, to enable the second network device to obtain a second entry based on the first BGP message, information about the second entry includes the first entry information, and the second entry is a backup entry of the first entry.

It may be understood that the first BGP message includes a route type field, and the route type field indicates that a type of a route advertised by the first BGP message is the entry backup route.

With reference to a specific implementation of the fifth aspect, the first BGP message includes EVPN NLRI, the EVPN NLRI is used to carry an ESI, the ESI is used by the second network device to obtain port information, and the second entry includes the port information.

With reference to another specific implementation of the fifth aspect, the first BGP message includes first NLRI and a newly defined SAFI, the SAFI indicates that an address family of the first BGP message is a BGP backup address family, the first NLRI is used to carry a backup_id, the backup_id is used by the second network device to obtain port information, and the second entry includes the port information.

With reference to still another specific implementation of the fifth aspect, the first entry is a DHCP SNP entry, the first entry information includes an IP address, a MAC address, and lease information, the first BGP message further includes a first extended community attribute, the NLRI includes the IP address and the MAC address, and the first extended community attribute includes the lease information.

With reference to yet another specific implementation of the fifth aspect, the apparatus further includes a second processing unit and a second sending unit.

The second processing unit is configured to: when duration of generating the first entry exceeds a valid lease indicated in the lease information, delete the first entry, and generate a second BGP message, where the second BGP message is used to advertise a route for withdrawing the backup entry to the second network device.

The second sending unit is configured to send the second BGP message to the second network device, where the second BGP message is used to indicate the second network device to delete the second entry.

With reference to still another specific implementation of the fifth aspect, the apparatus further includes a third processing unit and a third sending unit.

The third processing unit is configured to: when the first network device receives a go-offline request sent by user equipment, delete the first entry, and generate a third BGP message, where the third BGP message is used to advertise a route for withdrawing the backup entry to the second network device.

The third sending unit is configured to send the third BGP message to the second network device, where the third BGP message is used to indicate the second network device to delete the second entry.

With reference to still another specific implementation of the fifth aspect, the apparatus further includes a fourth processing unit and a fourth sending unit.

The fourth processing unit is configured to generate a fourth BGP message, where the fourth BGP message includes a second extended community attribute, and the second extended community attribute includes the first entry information.

The fourth sending unit is configured to send the fourth BGP message to a third network device, to enable the third network device to obtain a third entry based on the fourth BGP message, where information about the third entry includes the first entry information, and the third entry is a backup entry of the first entry.

With reference to another specific implementation of the fifth aspect, the fourth BGP message further includes a backup_id, the second extended community attribute includes the backup_id, the backup_id is used by the second network device to obtain port information, and the second entry includes the port information.

With reference to still another specific implementation of the fifth aspect, the first entry information includes a MAC address, the fourth BGP message further includes a third extended community attribute, and the third extended community attribute includes the MAC address.

With reference to another specific implementation of the fifth aspect, the first entry and the third entry are DHCP SNP entries, and the first entry information further includes lease lease information. In this case, the fourth BGP message further includes a fourth extended community attribute, and the fourth extended community attribute includes the lease information.

With reference to still another specific implementation of the fifth aspect, the first entry is an ARP entry, a NDP entry, an IGMP entry, an IGMP SNP entry, or a BAS entry.

It should be noted that the apparatus provided in the fifth aspect is an apparatus corresponding to the method provided in the first aspect, and corresponds to the method provided in the first aspect. Therefore, for various possible implementations and technical effects of the apparatus provided in the fifth aspect, refer to the description of the method provided in the first aspect.

According to a sixth aspect, an embodiment of this application further provides an apparatus for implementing entry backup, applied to a second network device, and including a first receiving unit and a first processing unit.

The first receiving unit is configured to receive a first BGP message sent by a first network device, where the first BGP message includes first entry information, the first entry information is information about a first entry stored in the first network device, and the first BGP message is used to advertise an entry backup route to the second network device.

The first processing unit is configured to: obtain a second entry based on the first BGP message, and store information about the second entry, where the second entry is a backup entry of the first entry, and the information about the second entry includes the first entry information.

It may be understood that the first BGP message includes a route type field, and the route type field indicates that a type of a route advertised by the first BGP message is the entry backup route.

With reference to a specific implementation of the sixth aspect, the first BGP message includes EVPN NLRI, the EVPN NLRI is used to carry an ESI, and the apparatus further includes: a second processing unit, configured to obtain port information based on the ESI, where the second entry includes the port information.

With reference to another specific implementation of the sixth aspect, the first BGP message includes first NLRI and a newly defined SAFI, the SAFI indicates that an address family of the first BGP message is a BGP backup address family, the first NLRI is used to carry a backup_id, and the apparatus further includes: a third processing unit, configured to obtain port information based on the backup_id, where the second entry includes the port information.

In an example, the first entry is a DHCP SNP entry, the first entry information includes an IP address, a MAC address, and lease information, and the first BGP message further includes a first extended community attribute. The first processing unit is specifically configured to obtain the second entry based on the IP address and the MAC address that are in the NLRI and the lease information included in the first extended community attribute. In this case, the apparatus further includes: a second receiving unit, configured to: when duration of generating the first entry exceeds a valid lease indicated in the lease information, receive a second BGP message sent by the first network device, where the second BGP message is used to advertise a route for withdrawing the backup entry to the second network device, and delete the second entry based on the second BGP message.

With reference to still another specific implementation of the sixth aspect, the apparatus further includes: a third receiving unit, configured to: when the first network device receives a go-offline request sent by user equipment, receive a third BGP message sent by the first network device, where the third BGP message is used to advertise a route for withdrawing the backup entry to the second network device, and delete the second entry based on the third BGP message.

With reference to another specific implementation of the sixth aspect, the apparatus further includes: a fourth receiving unit, configured to receive a fourth BGP message sent by the first network device, where the fourth BGP message includes a second extended community attribute, and the second extended community attribute includes the first entry information; and a fourth processing unit, configured to obtain a third entry based on the fourth BGP message, where information about the third entry includes the first entry information, and the third entry is a backup entry of the first entry.

With reference to still another specific implementation of the sixth aspect, the fourth BGP message further includes a backup_id, the second extended community attribute includes the backup_id, and the apparatus further includes: a fifth processing unit, configured to obtain port information based on the backup_id, where the second entry includes the port information.

It should be understood that the first entry information includes a MAC address, the fourth BGP message further includes a third extended community attribute, and the third extended community attribute includes the MAC address.

In an example, the first entry is a DHCP SNP entry, and the first entry information further includes lease information. In this case, the fourth BGP message further includes a fourth extended community attribute, and the fourth extended community attribute includes the lease information.

With reference to yet another specific implementation of the sixth aspect, the first entry is an ARP entry, a NDP entry, an IGMP entry, an IGMP SNP entry, or a BAS entry.

It should be noted that the apparatus provided in the sixth aspect is an apparatus corresponding to the method provided in the second aspect, and corresponds to the method provided in the second aspect. Therefore, for various possible implementations and technical effects of the apparatus provided in the sixth aspect, refer to the description of the method provided in the second aspect.

According to a seventh aspect, an embodiment of this application further provides an apparatus for implementing entry backup, applied to a first network device, and including a first processing unit and a first sending unit.

The first processing unit is configured to generate a first BGP message, where the first BGP message includes NLRI and a first extended community attribute, the first extended community attribute includes first entry information, and the first entry information is information about a first entry stored in the first network device.

The first sending unit is configured to send the first BGP message to a second network device, to enable the second network device to obtain a second entry based on the first BGP message, where information about the second entry includes the first entry information, and the second entry is a backup entry of the first entry.

With reference to a specific implementation of the seventh aspect, the first BGP message includes a backup_id, the first extended community attribute includes the backup_id, the backup_id is used by the second network device to obtain port information, and the second entry includes the port information.

With reference to another specific implementation of the seventh aspect, the first entry information includes a MAC address, the first BGP message further includes a second extended community attribute, and the second extended community attribute includes the MAC address.

In an example, the first entry and the second entry are DHCP SNP entries, and the first entry information further includes lease information. In this case, the first BGP message further includes a third extended community attribute, and the third extended community attribute includes the lease information.

With reference to still another specific implementation of the seventh aspect, the first entry is an ARP entry, a NDP entry, an IGMP entry, an IGMP SNP entry, or a BAS entry.

With reference to yet another specific implementation of the seventh aspect, the apparatus further includes: a second processing unit, configured to: when the first network device receives a go-offline request sent by user equipment, or when duration of generating the first entry exceeds a valid lease indicated in the lease information in the first entry information, delete the first entry, and generate a second BGP message, where the second BGP message is used to advertise a route for withdrawing the backup entry to the second network device; and a second sending unit, configured to send the second BGP message to the second network device, where the second BGP message is used to indicate the second network device to delete the second entry.

It should be noted that the apparatus provided in the seventh aspect is an apparatus corresponding to the method provided in the third aspect, and corresponds to the method provided in the third aspect. Therefore, for various possible implementations and technical effects of the apparatus provided in the seventh aspect, refer to the description of the method provided in the third aspect.

According to an eighth aspect, an embodiment of this application further provides an apparatus for implementing entry backup, applied to a second network device, and including a first receiving unit and a first processing unit.

The first receiving unit is configured to receive a first BGP message sent by a first network device, where the first BGP message includes NLRI and a first extended community attribute, the first extended community attribute includes first entry information, and the first entry information is information about a first entry stored in the first network device.

The first processing unit is configured to obtain a second entry based on the first BGP message, and store information about the second entry, where the information about the second entry includes the first entry information, to back up the first entry on the second network device, and the second entry is a backup entry of the first entry.

With reference to a specific implementation of the eighth aspect, the first BGP message includes a backup_id, the first extended community attribute includes the backup_id, and the apparatus further includes: a second processing unit, configured to obtain port information based on the backup_id, where the second entry includes the port information.

It should be understood that the first entry information includes a MAC address, the first BGP message further includes a second extended community attribute, and the second extended community attribute includes the MAC address.

In an example, the first entry is a DHCP SNP entry, and the first entry information further includes lease information. In this case, the first BGP message further includes a third extended community attribute, and the third extended community attribute includes the lease information.

With reference to yet another specific implementation of the eighth aspect, the first entry is an ARP entry, a NDP entry, an IGMP entry, an IGMP SNP entry, or a BAS entry.

With reference to still another specific implementation of the eighth aspect, the apparatus further includes: a second receiving unit, configured to: when the first network device receives a go-offline request sent by user equipment, or when duration of generating the first entry exceeds a valid lease indicated in the lease information in the first entry information, receive a second BGP message sent by the first network device, where the second BGP message is used by the first network device to advertise a route for withdrawing the backup entry to the second network device; and a third processing unit, configured to delete the second entry based on the second BGP message.

It should be noted that the apparatus provided in the eighth aspect is an apparatus corresponding to the method provided in the fourth aspect, and corresponds to the method provided in the fourth aspect. Therefore, for various possible implementations and technical effects of the apparatus provided in the eighth aspect, refer to the description of the method provided in the fourth aspect.

According to a ninth aspect, an embodiment of this application further provides a network device, where the network device includes a memory and a processor. The memory is configured to store program code. The processor is configured to run instructions in the program code, to enable the network device to perform the method for implementing entry backup provided in any one of the first aspect to the fourth aspect.

According to a tenth aspect, an embodiment of this application further provides a computer program product. When the computer program product runs on a computer, the computer is enabled to perform the method for implementing entry backup provided in any one of the first aspect to the fourth aspect.

According to an eleventh aspect, an embodiment of this application further provides a computer-readable storage medium. The computer-readable storage medium stores instructions, and when the instructions are run on a computer, the computer is enabled to perform the method for implementing entry backup provided in any one of the first aspect to the fourth aspect.

BRIEF DESCRIPTION OF DRAWINGS

To describe the technical solutions in the embodiments of this application more clearly, the following briefly describes the accompanying drawings used in describing the embodiments. It is clearly that the accompanying drawings in the following description show merely some embodiments of this application, and an ordinary person skilled in the art may derive other drawings from these accompanying drawings.

FIG. 5 is a schematic diagram of a format in which an EVPN NLRI carries a DHCP SNP entry according to an embodiment of this application;

FIG. 6 is a schematic diagram of a format of Lease_Community according to an embodiment of this application;

FIG. 7 is a schematic diagram of another format in which an EVPN NLRI carries a DHCP SNP entry according to an embodiment of this application;

FIG. 8 is a schematic diagram of a format of carrying lease information in a DHCP SNP entry according to an embodiment of this application;

FIG. 9 is a schematic diagram of defining a BGP backup address family according to an embodiment of this application;

FIG. 10 is a schematic diagram of a format in which an NLRI carries a DHCP SNP entry according to an embodiment of this application;

FIG. 11 is a schematic diagram of another format in which an NLRI carries a DHCP SNP entry according to an embodiment of this application;

FIG. 12 is a schematic flowchart of still another method for implementing entry backup according to an embodiment of this application;

FIG. 13 is a schematic diagram of a format of Backup_Community according to an embodiment of this application;

FIG. 14 is a schematic diagram of a format of MAC_Community according to an embodiment of this application;

DESCRIPTION OF EMBODIMENTS

With popularization of networks, network reliability becomes increasingly important. Generally, a dual-device backup manner is used in a network to improve network reliability. To be specific, user equipment is connected to a network side by using an active network device and a standby network device, and a service entry generated on the active network device is backed up to the standby network device. In this case, when the active network device runs normally, the user equipment performs data interaction with the network side by using the service entry stored in the active network device, to provide a corresponding business service. Once the active network device is faulty, the standby network device may be switched to a new active network device, and the user equipment performs data interaction with the network side by using a service entry backed up on the standby network device, to provide a corresponding business service.

Figure 1:
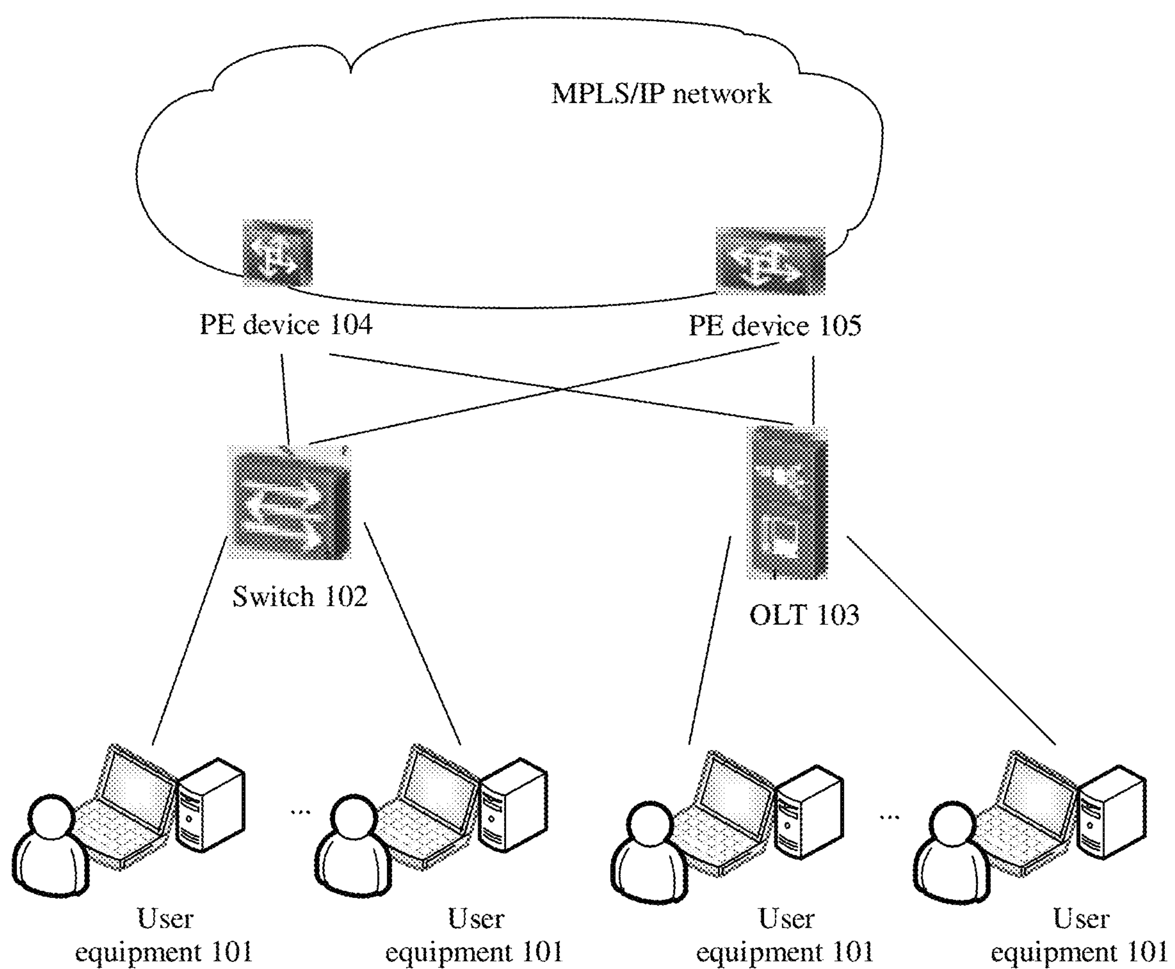
FIG. 1 is a schematic diagram of a network architecture of a dual-device backup scenario according to an embodiment of this application.

FIG. 1 is a schematic diagram of a network architecture of a dual-device backup scenario according to an embodiment of this application. In a network, user equipment 101 is connected to a switch 102 or an optical line terminal (OLT) 103, and is connected to a provider edge (PE) device 104 and a PE device 105 by using the switch 102 or the OLT 103. The PE device 104 and the PE device 105 access a same location on a network side. In an example, after the user equipment 101 goes online, the PE device 104 may generate an ARP entry corresponding to an ARP service. In this case, the PE device 104 needs to back up the ARP entry to the PE device 105, so that when the PE device 104 is faulty, the PE device 105 can be quickly used, and the PE device 105 can be normally used to provide the ARP service.

The accessed network may be, for example, a multiprotocol label switching (Multiprotocol Label Switching or MPLS) network or an internet protocol (Internet Protocol or IP) network. It should be noted that the PE device 104 and the PE device 105 may alternatively be a broadband access server (Broadband Access Server or BAS) 104' and a BAS 105'.

It may be understood that, because the network provides different business services, data types of entries that need to be backed up by a network device are also different. Currently, vendors may back up entries corresponding to various service types between their network devices by using their own proprietary protocols.

As a network structure becomes increasingly complex and large, network devices of different vendors need to coexist in the network. However, currently, there is no unified standard to be universally used in entry backup by the network devices of the different vendors, that is, entry backup between the network devices of the different vendors cannot be implemented. As a result, dual-device backup or even multi-device backup cannot be used to improve network reliability on a network that includes the network devices of the different vendors.

Based on this, in this embodiment of this application, a newly defined BGP route type, namely, an entry backup route is extended, or an extended community attribute is added to a BGP route. Information (namely, first entry information) about a first entry generated on the network device is carried in a first BGP message. Because the first BGP message used to advertise the newly defined entry backup route and a common BGP route can be received, sent, and identified by the network devices of the different vendors, a problem that entry backup between the network devices of the different vendors cannot be implemented by using proprietary protocols of the vendors to perform entry backup is overcome. The newly defined BGP route type that can be universally used by the network devices of the different vendors is provided, or the extended community attribute may be added to the common BGP route that can be universally used by the network devices of the different vendors, so that entry backup can be performed easily and conveniently between the network devices of the different vendors. Therefore, reliability of the network that includes the network devices of the different vendors can be improved in a multi-device backup manner.

Figure 2:
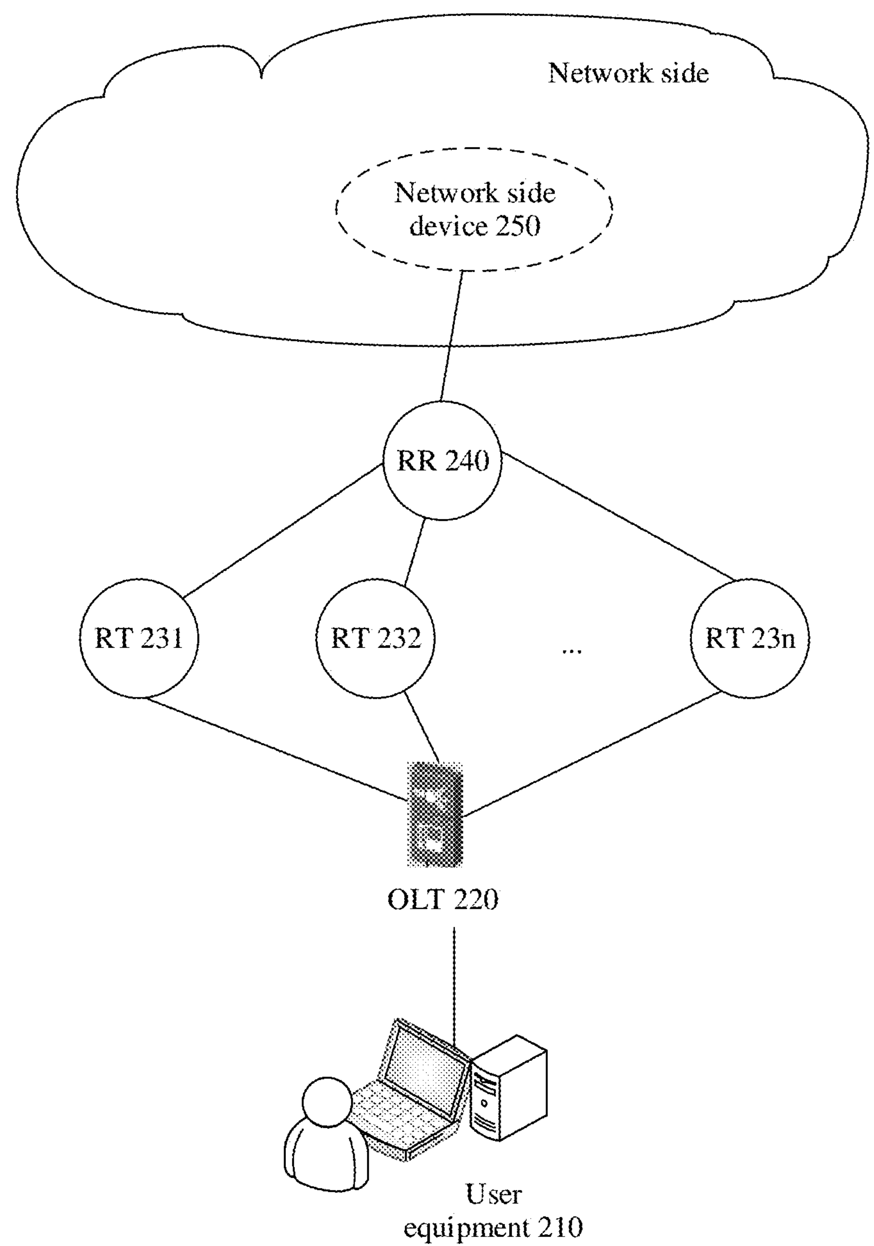
FIG. 2 is a schematic diagram of a network architecture of a multi-device backup scenario according to an embodiment of this application.

For example, one of scenarios of the embodiments of this application may be applied to a network architecture shown in FIG. 2. A network includes user equipment 210, an OLT 220, a remote device (Remote Terminal or RT) 231, an RT 232, . . . , an RT **23*n* (n is an integer greater than or equal to 2), a route reflector (RR) 240, and a network side device 250. The user equipment 210 is separately connected to the RT 231, the RT 232, . . . , and the RT 23*n* through the OLT 220, the RT 231, the RT 232, . . . , and the RT 23*n* are all connected to the RR 240, and the RR 240 is connected to the network side device 250. The RR 240 separately establishes a BGP peer relationship with the RT 231, the RT 232, . . . , and the RT 23*n*. In this way, the RT 231, the RT 232, . . . , and the RT 23*n* do not need to establish a complex BGP connection or establish a peer relationship with each other. Routing information may be reflected between the RT 231, the RT 232, . . . , and the RT 23*n* through the RR 240**.

In an example, when an entry 1 is generated on the RT 231, by using an extended entry backup route or adding an extended community attribute to a BGP route, the RT 231 may include information about the entry 1 in a BGP message 1, and send the BGP message 1 to the RR 240. After receiving the BGP message 1, the RR 240 may separately send the BGP message 1 to the RT 232, the RT 233, . . . , and the RT **23*n*. In one case, if the RT 232, the RT 233, . . . , and the RT 23*n* all support the BGP message 1, the RT 232, the RT 233, . . . , and the RT 23*n* all process the BGP message 1, and obtain and store an entry 2, where information about the entry 2 includes the information about the entry 1, to implement backup of the entry 1 generated by the RT 231 on the RT 232, the RT 233, . . . , and the RT 23*n*. In another case, if the RT 232, the RT 233, . . . , and the RT 23*n* only partially support the BGP message 1, an RT that does not support the BGP message 1 does not process the received BGP message 1, and an RT that supports the BGP message 1 processes the BGP message 1, and obtains and stores an entry 2, to implement backup of the entry 1 generated by the RT 231** on the RT that supports the BGP message 1.

It should be noted that, the RT that supports the BGP message 1 may be an RT that has enabled the extended entry backup route or the BGP route to which the extended community attribute is added, and that may perform operations such as receiving, sending, and processing the corresponding BGP message 1.

It may be understood that the RT in this example may be specifically a PE device such as a router or a switch, or may be a BAS, or may be any network device that implements a function in this embodiment of this application. The RR may be a network device such as a router or a switch that has a function of reflecting routing information.

It should be noted that FIG. 2 shows only a network architecture for implementing entry backup. In this embodiment of this application, entry backup may not be performed by using the RR. In other words, a BGP peer may be established between an active network device and each standby network device, so that the active network device directly sends the BGP message 1 to each standby network device. The active network device directly sends the BGP message 1 to each standby network device.

It may be understood that the foregoing scenario is merely an example of a scenario provided in this embodiment of this application, and this embodiment of this application is not limited to this scenario.

With reference to the accompanying drawings, the following describes in detail a specific implementation of a method for implementing entry backup in the embodiments of this application by using embodiments. It should be noted that descriptions such as "first entry" and "entry 1", "second entry" and "entry 2", "first BGP message" and "BGP message 1", and similar descriptions in the following embodiments all represent different content.

In this embodiment of this application, in some implementations, in a manner of newly defining a BGP route type, namely, an entry backup route, a BGP message used to indicate to advertise the entry backup route may be sent between network devices, to implement entry backup between the network devices. For a specific implementation, refer to related descriptions in the embodiment corresponding to FIG. 3. In other implementations, in a manner of adding an extended community attribute to a BGP route, a BGP message that includes the newly added extended community attribute may be sent between network devices, to implement entry backup between the network devices. For a specific implementation, refer to related descriptions in the embodiment corresponding to FIG. 12.

Figure 3:
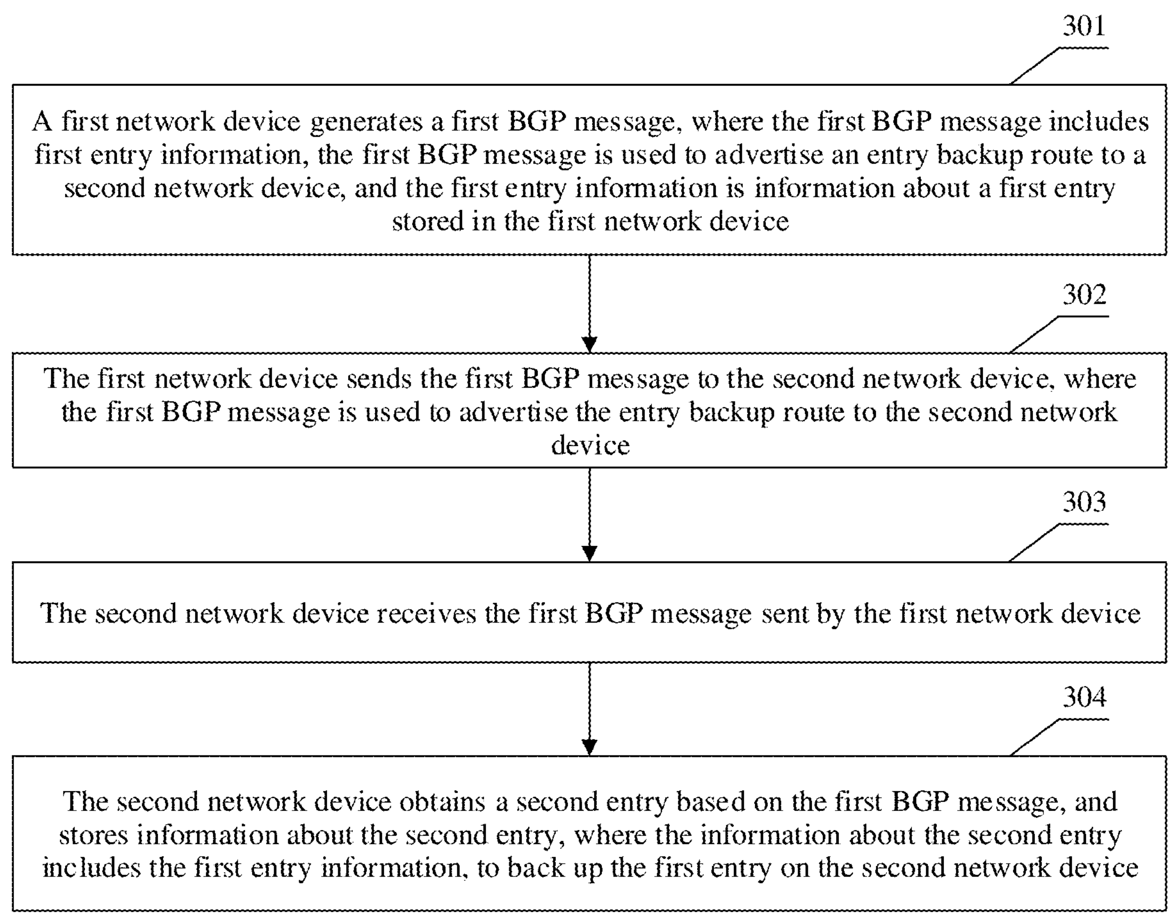
FIG. 3 is a schematic flowchart of a method for implementing entry backup according to an embodiment of this application.

FIG. 3 is a schematic flowchart of a method for implementing entry backup according to an embodiment of this application. When a first network device backs up an entry to a second network device, referring to FIG. 3, the method may include, for example, the following step 301 to step 304.

Step 301: A first network device generates a first BGP message, where the first BGP message includes first entry information, the first BGP message is used to advertise an entry backup route to a second network device, and the first entry information is information about a first entry stored in the first network device.

It may be understood that, when user equipment enables, by using the first network device, a protocol corresponding to a service to go online, the first network device may generate a first entry corresponding to the service, to guide normal provision of the service. For example, when the user equipment enables, by using the first network device, a dynamic host configuration protocol (DHCP) corresponding to a dynamic host configuration protocol snooping (DHCP SNP) service to go online, the first network device may generate a DHCP SNP entry, to guide normal provision of the DHCP SNP service.

The first entry may be specifically the DHCP SNP entry, an ARP entry, a neighbor discovery protocol (NDP) entry, an internet group management protocol (Internet Group Management Protocol or IGMP) entry, an internet group management protocol snooping (Internet Group Management Protocol Snooping or IGMP SNP) entry, or a BAS entry.

The first entry information is the information about the first entry, and may specifically include different content based on different service types to which the first entry belongs. For example, when the first entry is the DHCP SNP entry, the first entry information may include at least an internet protocol (IP) address, a media access control (MAC) address, and lease information, and may further include a virtual local area network (VLAN) information. For another example, when the first entry is the ARP entry, the first entry information may include at least an IP address and a MAC address, and may further include VLAN information. For yet another example, when the first entry is the IGMP entry or the IGMP SNP entry, the first entry information may include at least a source IP address and a group IP address.

It should be noted that, when the user equipment is connected to a plurality of network devices by using a switch or an OLT, and the plurality of network devices access a same location on a network side, a multi-device backup scenario is formed. The first network device that generates the first entry may be used as an active network device. To effectively improve network reliability in a multi-device backup structure, the active network device may back up the first entry information corresponding to the first entry to another standby network device. In this embodiment of this application, an example in which the first network device backs up the first entry information to the second network device is used for description. For implementations of backing up the first entry information to the another standby network device, refer to implementations and related descriptions in the embodiments of this application.

For the multi-device backup scenario, before step 301 is implemented, pre-configuration may be performed on the network. For example, according to a first aspect, the network is configured to support an interior gateway protocol (IGP), a multiprotocol label switching (MPLS) protocol, or a border gateway protocol (BGP), to enable a BGP route to be reachable. Active and standby network devices can be directly connected, to establish a BGP peer, or a BGP peer can be established between a route reflector (RR) and all active and standby network devices through transit of the RR. According to a second aspect, a same interface identifier is configured for interfaces that are used by the active and standby network devices to connect to the switch or the OLT. For an Ethernet virtual private network (EVPN) network, the same interface identifier is an Ethernet segment identifier (ESI), and for a non-EVPN network, the same interface identifier is a newly configured backup interface identifier (backup_id). According to a third aspect, an interface, of each active/standby network device, connected to the switch or the OLT is configured to access a corresponding network and a corresponding service is enabled. For example, in a Layer 2 EVPN (L2EVPN) scenario, an interface, of each active/standby network device, connected to the switch or the OLT may be configured to access an L2EVPN interface and a corresponding service is enabled on the interface. For another example, in a Layer 3 non-EVPN scenario, an interface, of each active/standby network device, connected to the switch or the OLT may be configured to access a public network IP address or an L3VPN, a DCHP relay is configured on the interface to forward a DHCP packet to a remote server, and a DHCP SNP service is enabled on the interface.

For example, when the user equipment is dual-homed to a PE1 and a PE2, the PE1 and the PE2 connect to the user equipment through a same port. In this case, a same ESI or backup_id may be configured for the port in advance on the PE1 and the PE2. In subsequent entry backup, port information corresponding to the same ESI or backup_id is used as one of content of backup entry, and is used to indicate a port corresponding to backup entry.

It may be understood that, a BGP route type may be added, that is, a type value that indicates the BGP route type is extended, and a BGP route type corresponding to a newly assigned value type is defined as the entry backup route. Before step 301, a newly defined entry backup route may be enabled on each active/standby network device. In this way, each active/standby network device may perform operations such as receiving, sending, and processing on a BGP message corresponding to the entry backup route.

In a specific implementation, the first network device on which the entry backup route is enabled may generate, based on the first entry generated and stored in the first network device, the first BGP message used to advertise the entry backup route, where the first BGP message includes the first entry information. The first BGP message includes a route type field, and the route type field indicates that a type of the route advertised by the first BGP message is the entry backup route.

In an example, in an EVPN scenario, the first BGP message may include network layer reachability information (NLRI) of the EVPN. For details, refer to related descriptions of the examples corresponding to FIG. 5 to FIG. 8. In another example, whether there is the EVPN scenario is not limited, the first BGP message may include first NLRI and a newly defined subsequent address family identifier (SAFI), the SAFI indicates that the first BGP message is used to advertise the entry backup route. It should be noted that, a new value is assigned to the SAFI, and the newly assigned SAFI is defined to indicate a BGP backup address family, and indicate that the type of the route advertised by the first BGP message is the entry backup route. For details, refer to related descriptions of the examples corresponding to FIG. 8 to FIG. 11.

The first entry information may be completely carried in the NLRI in the first BGP message, or the first entry information may be partially carried in the NLRI and partially carried in an extended community attribute or a TLV. For details, refer to related descriptions of examples corresponding to FIG. 7, FIG. 8, and FIG. 11.

In step 301, the first network device generates the first BGP message, and adds the information about the first entry to the first BGP message. Because the second network device enables the entry backup route, and can identify the first BGP message. In step 301, a database is provided for the first network device to subsequently back up the first entry to the second network device by using the first BGP message.

Step 302: The first network device sends the first BGP message to the second network device, where the first BGP message is used to advertise the entry backup route to the second network device.

Step 303: The second network device receives the first BGP message sent by the first network device.

It may be understood that the second network device may be a standby network device of the first network device. The standby network device of the first network device may be one standby network device of the first network device, or may generally be a plurality of standby network devices of the first network device.

In a specific implementation, in one case, the first network device and the second network device each are connected to a route reflector, to establish a BGP peer. In this case, the first network device sends the first BGP message to the route reflector, and the route reflector directly forwards the received first BGP message to the second network device. In another case, if the first network device and the second network device are directly connected, to establish a BGP peer, the first network device directly sends the first BGP message to the second network device.

It may be understood that because the second network device enables the entry backup route, the second network device may receive and identify the first BGP message, and may further perform another processing operation on the first entry information carried in the first BGP message. In this way, it is possible to back up the first entry on the second network device.

Step 304: The second network device obtains a second entry based on the first BGP message, and stores information about the second entry, where the information about the second entry includes the first entry information, to back up the first entry on the second network device.

In a specific implementation, after receiving the first BGP message, the second network device may parse the first BGP message, and determine, by using the route type field in the first BGP message, that the type of the route advertised by the first BGP message is the entry backup route. In this case, if the entry backup route is not enabled on the second network device, the second network device does not process the first BGP message; and if the entry backup route is enabled on the second network device, the second network device processes the first BGP message, and obtains and stores the second entry, where the information about the second entry includes the first entry information, and the second entry is a backup entry of the first entry on the second network device.

A process in which the second network device processes the first BGP message may specifically include interface matching and second entry generation. In the EVPN scenario, the second network device may perform interface matching based on the ESI in the first entry information of the received first BGP message. If the matching succeeds, the second network device generates the second entry based on information such as the IP address and the MAC address in the first entry information. In the non-EVPN scenario, the second network device may perform interface matching based on the backup_id in the first entry information of the received first BGP message. If the matching succeeds, the second network device generates the second entry based on information such as the IP address and the MAC address in the first entry information. It should be noted that, when the first entry information includes the VLAN, an interface matching process may alternatively be: The second network device performs interface matching based on the VLAN and the ESI (or the VLAN and the backup_id) in the first entry information of the received first BGP message.

It may be understood that if the first entry information is completely carried in the NLRI in the first BGP message, step 301 may be specifically: The second network device obtains the second entry based on the first entry information carried in the NLRI. If the first entry information is partially carried in the NLRI and partially carried in the extended community attribute or the TLV, step 301 may be specifically: The second network device obtains, based on information such as the IP address and the MAC address in the first entry information carried in the NLRI and the lease information carried in the extended community attribute or the TLV, the second entry. For details, refer to related descriptions of the examples corresponding to FIG. 5 to FIG. 11.

It should be noted that because the first network device is not explicitly set as the active network device and the second network device is not explicitly set as the standby network device, after the second network device obtains and stores the second entry, and completes backup of the first entry generated by the first network device, the second network device may further mark that the second entry is generated based on the entry backup route. In this way, a problem, of wasting network resources and easily appearing an error of entry backup, caused by a fact that the second network device reversely backs up the second entry to the first network device and another standby network device, and therefore a to-be-backed-up entry is continuously backed up between the active and standby network devices can be avoided.

In some specific implementations, when the first entry stored in the first network device is updated to an entry 3, this embodiment of this application may further include a process of updating a backed-up entry. In a specific implementation, this embodiment may include: S11: The first network device generates a BGP message 1, where the BGP message 1 includes entry 3 information, and the entry 3 information includes information about the entry 3 stored in the first network device; S12: The first network device sends the BGP message 1 to the second network device, where the BGP message 1 is used to advertise an entry backup route to the second network device; S13: The second network device receives the BGP message 1; and S14: The second network device obtains an entry 4 based on the BGP message 1, where information about the entry 4 includes the entry 3 information. In this way, consistency between the entry backed up on the second network device and the entry stored in the first network device is ensured, so that the second network device can accurately provide a corresponding business service after an active/standby switchover, thereby ensuring network reliability.

In some other specific implementations, when the first network device receives a go-offline request sent by the user equipment, or for the DHCP SNP entry, duration of generating the DHCP SNP entry exceeds a valid lease indicated in the lease information, this embodiment of this application may further include a process of deleting a corresponding entry on the active/standby network device. In a specific implementation, this embodiment may include: S21: The first network device deletes the first entry or the entry 3 currently stored in the first network device, and generates a second BGP message or a third BGP message, where the second BGP message or the third BGP message is used to advertise a route for withdrawing the backup entry to the second network device; S22: The first network device sends the second BGP message or the third BGP message to the second network device; S23: The second network device receives the second BGP message or the third BGP message; and S24: The second network device deletes, based on the second BGP message or the third BGP message, the second entry or the entry 4 currently stored in the second network device. In this way, a service corresponding to the entry is brought offline, and resources on the network device are released.

The second BGP message may correspond to a case in which the duration of generating the DHCP SNP entry exceeds the valid lease indicated in the lease information, and the third BGP message may correspond to a case in which the first network device receives the go-offline request sent by the user equipment. Alternatively, the second BGP message and the third BGP message may be a same BGP message, and are both used to indicate to advertise another newly defined route for withdrawing the backup entry to the second network device.

It should be noted that, for a process in which service entries corresponding to various service types are backed up by using the method provided in this embodiment of this application, refer to related descriptions in the following instances corresponding to FIG. 5 to FIG. 11.

It can be learned that a newly defined BGP route type, namely, the entry backup route, is extended in the method provided in this embodiment of this application. The entry backup route is applicable to network devices of various vendors. To be specific, network devices of different vendors may perform operations such as receiving, sending, and identifying the first BGP message that advertises the entry backup route, thereby overcoming a problem that entry backup between the network devices of the different vendors cannot be implemented by using proprietary protocols of the vendors to perform entry backup. The newly defined BGP route type that can be universally used by the network devices of the various vendors is provided, so that entry backup can be performed easily and conveniently between the network devices of the different vendors. Therefore, reliability of a network that includes the network devices of the different vendors can be improved in a multi-device backup manner.

Figure 4:
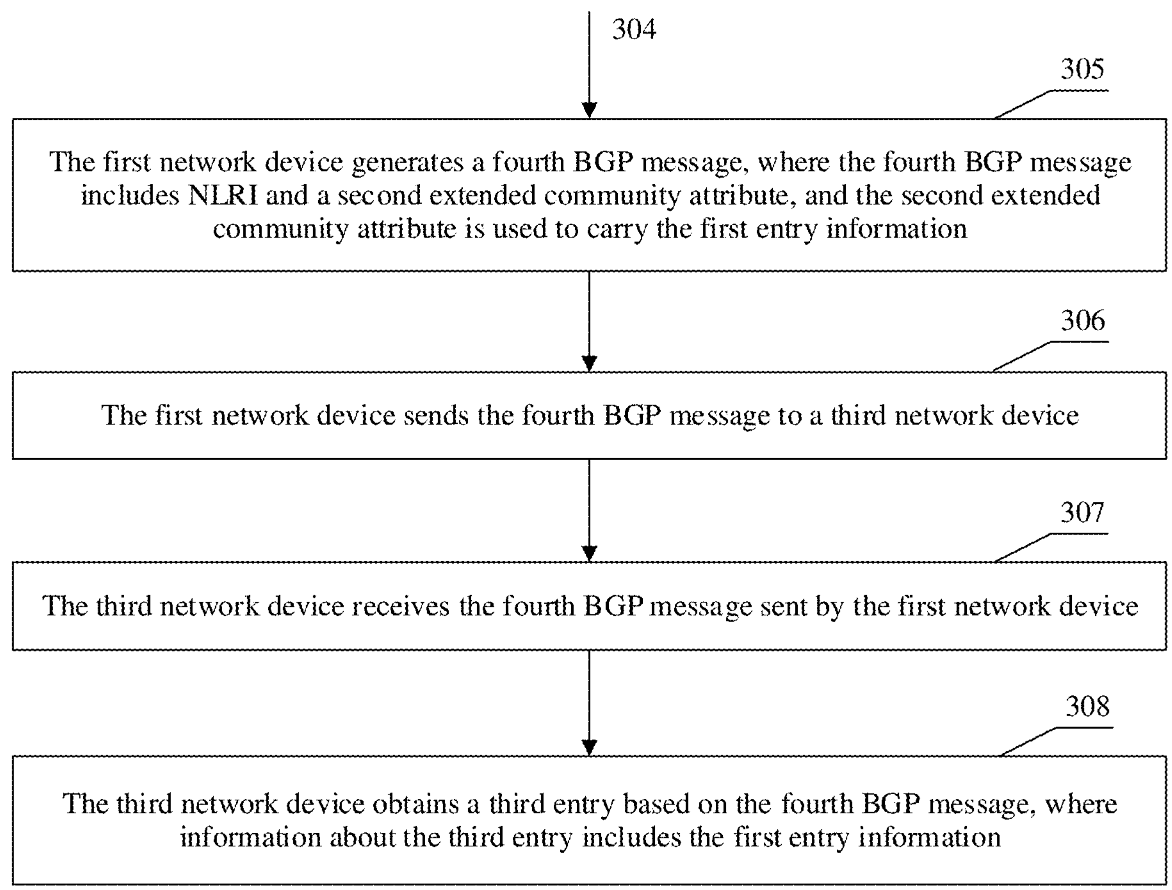
FIG. 4 is a schematic flowchart of another method for implementing entry backup according to an embodiment of this application.

In addition, in the method for implementing entry backup shown in FIG. 3, if the BGP route to which the extended community attribute is newly added is enabled on the second network device or the third network device in the network, a BGP message that includes the newly added extended community attribute may be sent between the network devices, to implement entry backup between the network devices. That is, as shown in FIG. 4, after step 304, this embodiment of this application may further include the following steps:

Step 305: The first network device generates a fourth BGP message, where the fourth BGP message includes a second extended community attribute, and the second extended community attribute is used to carry the first entry information.

Step 306: The first network device sends the fourth BGP message to the third network device.

Step 307: The third network device receives the fourth BGP message sent by the first network device.

Step 308: The third network device obtains a third entry based on the fourth BGP message, where information about the third entry includes the first entry information, and the third entry is a backup entry of the first entry.

It can be learned that, in step 305 to step 308, a process of backing up the first entry generated on the first network device to the third network device in a manner different from the entry backup manner provided in step 301 to step 304 is implemented.

It should be noted that if each active/standby network device in the network supports the entry backup manners corresponding to step 301 to step 304 and step 305 to step 308, this embodiment of this application may further include an operation of selecting a backup manner on the first network device based on an actual requirement. If the first network device determines to implement entry backup by using a manner of the entry backup route, entry backup may be implemented by using step 301 to step 304. If the first network device determines to implement entry backup by adding the extended community attribute to the BGP route, entry backup may be implemented by using step 305 to step 308. It should be noted that, when entries of different services have backup requirements, the first network device may also back up different service entries to the standby network device by using a same entry backup manner or different entry backup manners at the same time.

It should be noted that for a specific implementation of step 305 to step 308, refer to the following description corresponding to the embodiment in FIG. 12.

To make the embodiment corresponding to FIG. 3 clearer, the following describes, with reference to the accompanying drawings, a process of backing up two specific service entries by using the method provided in FIG. 3.

For the DHCP SNP service, the first entry that is generated on the first network device and that is to be backed up to the second network device is the DHCP SNP entry. The first entry information includes at least the IP address, the MAC address, and the lease information.

In an example, in the EVPN scenario, a same ESI may be configured for interfaces that are used by the first network device and the second network device to connect to the switch or the OLT. In this case, the first BGP message includes the EVPN NLRI, and the EVPN NLRI is used to carry the first entry information.

In a case, FIG. 5 is a schematic diagram of a format in which only the EVPN NLRI is used to carry the first BGP message according to an embodiment of this application. Fields included in the EVPN NLRI and corresponding meanings are as follows: (1) a type field, which is used to indicate that a type of a route advertised by the first BGP message is a DHCP SNP entry backup route newly defined in the EVPN scenario, and may be used as a route type field included in the first BGP message, or may be two fields having a same indication effect; (2) a length field, which may be used to indicate a length of the EVPN NLRI; (3) a route distinguisher field, which is used to identify a route in the EVPN scenario; (4) an Ethernet segment identifier field, which is used to identify an interface identifier configured for an interface corresponding to the DHCP SNP entry; (5) an Ethernet Tag identifier (Ethernet Tag ID) field, which is used to indicate a VLAN value of an interface corresponding to the DHCP SNP entry; (6) a MAC address length field, which is used to advertise a length of a MAC address; (7) a MAC address field, which is used to indicate a MAC address of the DHCP SNP entry; (8) an IP address length field, which is used to advertise a length of a host IP address mask; (9) an IP address field, which is used to indicate an IP address of the DHCP SNP entry; (10) a lease information field, which is used to indicate lease information of the DHCP SNP entry, and a format may be "year-month-day-hour-minute-second", for details, refer to FIG. 6, and the lease information field specifically includes year, month, day, hour, minute, second, and reserve, used to respectively indicate year, month, day, hour, minute, second, and reserved fields of a lease; and (11) an originating router's IP address field, which is a source IP address configured on the first network device.

In another case, the first BGP message in this embodiment of this application may include the EVPN NLRI and the extended community attribute, where the extended community attribute is used to carry the lease information in the first entry information. The EVPN NLRI is used to carry the IP address and the MAC address in the first entry information, or the EVPN NLRI is used to carry the IP address, the MAC address, and the VLAN information in the first entry information. For the EVPN NLRI, refer to FIG. 7 (that is, the lease information field in FIG. 5 is deleted). For the extended community attribute Lease_Community, refer to FIG. 8. Fields included in the Lease_Community and corresponding meanings are as follows: (1) an extended community attribute type (Extend-Community type) field, which is used to indicate a type of an extended community attribute newly defined for a DHCP SNP entry backup route in the EVPN scenario; (2) an extended community attribute sub-type (Extend-Community sub-type) field, which is used to indicate a sub-type of the extended community attribute; and (3) year, month, day, hour, minute, second, and reserve, which respectively indicate year, month, day, hour, minute, second, and reserved fields of a lease.

In still another case, the first BGP message in this embodiment of this application may alternatively include the EVPN NLRI and a first TLV, where the first TLV is used to carry the lease information in the first entry information. The EVPN NLRI is used to carry the IP address and the MAC address in the first entry information, or the EVPN NLRI is used to carry the IP address, the MAC address, and the VLAN information in the first entry information. A value field in the first TLV is used to carry the lease information.

In this example, in a specific implementation, if the EVPN NLRI does not include the Ethernet tag identifier (Ethernet Tag ID), after receiving the first BGP message, the second network device may obtain the ESI, the MAC address, the IP address, and the lease information by parsing the first BGP message. If it is determined that the ESI matches the interface configured on the second network device, the second network device generates the second entry on the corresponding interface based on the MAC address, the IP address, and the lease information, and stores the second entry. If the EVPN NLRI includes the Ethernet tag ID, after receiving the first BGP message, the second network device may obtain the ESI, the MAC address, the Ethernet tag ID, the IP address, and the lease information by parsing the first BGP message. If it is determined that both the ESI and the Ethernet tag ID match the interface configured on the second network device, the second network device generates the second entry on the corresponding interface based on the MAC address, the IP address, the lease information, and the VLAN information indicated by the Ethernet tag ID, and stores the second entry. It should be noted that, while storing the second entry, the second network device may further mark that the second entry is generated based on the DHCP SNP entry backup route indicated by the first BGP message.

In another example, whether there is the EVPN scenario is not limited, a same ESI or backup_id may be configured for interfaces that are used by the first network device and the second network device to connect to the switch or the OLT. In this case, the first entry information further includes the ESI or the backup_id. In this case, the first BGP message may include the NLRI and the newly defined SAFI, and the SAFI indicates that the first BGP message is used to advertise the entry backup route. FIG. 9 is a schematic diagram of defining a BGP address family. An AFI is used to indicate whether the address family is an IPv4 address family or an IPv6 address family. For example, if AFI=1 and SAFI=X are defined, the BGP address family is an IPv4 backup BGP address family, and if AFI=2 and SAFI=Y are defined, the BGP address family is an IPv6 backup BGP address family. In the newly defined address family, the first BGP message includes the NLRI, and the NLRI is used to carry the first entry information.

In one case, FIG. 10 is a schematic diagram of a format in which only the first entry information corresponding to the DHCP SNP entry is carried in the NLRI according to an embodiment of this application. Fields included in the NLRI and corresponding meanings are as follows: (1) a route type field, which is used to indicate a type of an entry backed up by a BGP route advertised by the first BGP message, for example, route type=1 indicates that a DHCP SNP entry is backed up; and route type=2 indicates that an ARP entry is backed up; (2) a length field, which may be used to indicate a length of the NLRI; (3) an interface identifier (Ethernet Segment Identifier or Backup ID) field, which is used to identify an interface identifier configured for an interface corresponding to the first entry; (4) an Ethernet interface identifier (Ethernet Tag ID) field, which is used to indicate a VLAN value of an interface corresponding to the first entry; (5) a MAC address length field, which is used to advertise a length of a MAC address; (6) a MAC address field, which is used to indicate a MAC address of the first entry; (7) an IP address length field, which is used to advertise a length of a host IP address mask; (8) an IP address field, which is used to indicate an IP address of the first entry; (9) an originating router's IP address field, which is a source IP address and a passive IP address that are configured on the first network device may be replaced with a BGP route identifier (BGP router-id); and (10) a lease information field, which is used to indicate the lease information of the first entry, and a format may be "year-month-day-hour-minute-second", and for details, refer to FIG. 6.

In another case, the first BGP message in this embodiment of this application may further include the extended community attribute information shown in FIG. 8, and is used to carry the lease information in the first entry information. The NLRI is used to carry the IP address and the MAC address in the first entry information, or the EVPN NLRI is used to carry the IP address, the MAC address, and the VLAN information in the first entry information. For the NLRI, refer to FIG. 11. Only the lease information field in FIG. 10 is deleted.

In still another case, the first BGP message in this embodiment of this application may alternatively include the TLV, and a value field in the TLV is used to carry the lease information in the first entry information. The NLRI is used to carry the IP address and the MAC address in the first entry information, or the EVPN NLRI is used to carry the IP address, the MAC address, and the VLAN information in the first entry information.

In this example, in a specific implementation, if the NLRI does not include the Ethernet tag identifier (Ethernet Tag ID), after receiving the first BGP message, the second network device obtains the backup_id (or the ESI), the MAC address, the IP address, and the lease information by parsing the first BGP message, and first determines that the first entry is the DHCP SNP entry by using the route type. If it is determined that the backup_id (or the ESI) matches a backup_id (or an ESI) of a port on the second network device, the second network device obtains port information of the port, and the second network device may generate the second entry based on the MAC address, the IP address, the lease information, and the port information, and store the second entry. If the NLRI includes the Ethernet tag ID, after receiving the first BGP message, the second network device may first determine, by using the route type, that the first entry is the DHCP SNP entry. If it is determined that the backup_id (or the ESI) matches a backup_id (or an ESI) of a port on the second network device, and the Ethernet tag ID matches VLAN information of the port on the second network device, the second network device may obtain port information of the port, generate the second entry based on the MAC address, the IP address, the lease information, the VLAN information, and the port information, and store the second entry. It should be noted that, while storing the second entry, the second network device may further mark that the second entry is generated based on the DHCP SNP entry backup route indicated by the first BGP message.

For the ARP service, the first entry that is generated on the first network device and that is to be backed up to the second network device is the ARP entry. The first entry information includes at least the IP address and the MAC address.

In an example, in the EVPN scenario, a same ESI may be configured for interfaces that are used by the first network device and the second network device to connect to the switch or the OLT. In this case, the first entry information further includes the ESI. In this case, the first BGP message includes the EVPN NLRI, and the EVPN NLRI is used to carry the first entry information.

It may be understood that FIG. 7 may further be a schematic diagram of a format in which the first entry information corresponding to the ARP entry is carried only by using the EVPN NLRI in this embodiment of this application. Fields included in the EVPN NLRI and corresponding meanings are as follows: (1) a type field, which is used to indicate that a type of a route advertised by the first BGP message is an ARP entry backup route newly defined in the EVPN scenario, and may be used as a route type field included in the first BGP message, or may be two fields having a same indication effect; (2) a length field, which may be used to indicate a length of the EVPN NLRI; (3) a route distinguisher field, which is used to identify a route in the EVPN scenario; (4) an Ethernet segment identifier field, which is used to identify an interface identifier configured for an interface corresponding to the ARP entry; (5) an Ethernet tag identifier field, which is used to indicate a VLAN value of an interface corresponding to the ARP entry; (6) a MAC address length field, which is used to advertise a length of a MAC address; (7) a MAC address field, which is used to indicate a MAC address of the ARP entry; (8) an IP address length field, which is used to advertise a length of a host IP address mask; (9) an IP address field, which is used to indicate an IP address of the ARP entry; and (10) an originating router's IP address, which is a source IP address configured on the first network device.

In a specific implementation, if the EVPN NLRI does not include the Ethernet tag ID, after receiving the first BGP message, the second network device may obtain the ESI, the MAC address, and the IP address by parsing the first BGP message. If it is determined that the ESI matches an ESI of a port on the second network device, the second network device obtains port information of the port. In addition, the second network device may generate the second entry based on the MAC address, the IP address, and the port information, and store the second entry. If the EVPN NLRI includes the Ethernet tag ID, after receiving the first BGP message, the second network device may obtain the ESI, the MAC address, the Ethernet tag ID, and the IP address by parsing the first BGP message. If it is determined that the ESI matches an ESI of a port on the second network device, and the Ethernet tag ID matches VLAN information of a port on the second network device, the second network device may obtain port information of the port, generate the second entry based on the MAC address, the IP address, the VLAN information, and the port information, and store the second entry. It should be noted that, while storing the second entry, the second network device may further mark that the second entry is generated based on the DHCP SNP entry backup route indicated by the first BGP message.

In another example, not limited to the EVPN scenario, the first network device and the second network device are connected to a same port of the switch or the OLT. Therefore, a same ESI or backup_id may be configured on the same port on the first network device and the second network device. In addition, the ESI or the backup_id is carried in the first BGP message when the entry is backed up. In this case, the first BGP message may include the NLRI and the newly defined SAFI, and the SAFI indicates that the first BGP message is used to advertise the entry backup route. FIG. 9 is a schematic diagram of defining a BGP address family. For example, if AFI=1 and SAFI=X are defined, the BGP address family is an IPv4 backup BGP address family, and if AFI=2 and SAFI=Y are defined, the BGP address family is an IPv6 backup BGP address family. In the newly defined address family, the first BGP message includes the NLRI, and the NLRI is used to carry the first entry information.

It may be understood that FIG. 10 may further be a schematic diagram of a format in which only the first entry information corresponding to the DHCP SNP entry is carried in the NLRI in this embodiment of this application. Fields included in the NLRI and corresponding meanings remain unchanged. A value of the route type field indicates that the BGP route advertised in the first BGP message backs up the ARP entry.

In a specific implementation, if the NLRI does not include the Ethernet tag ID, after receiving the first BGP message, the second network device obtains the backup_id (or the ESI), the MAC address, and the IP address by parsing the first BGP message, and first determines that the first entry is the ARP entry by using the route type. If it is determined that the backup_id (or the ESI) matches a backup_id (or an ESI) of a port on the second network device, the second network device obtains port information of the port, and the second network device may generate the second entry based on the MAC address, the IP address, and the port information, and store the second entry. If the NLRI includes the Ethernet tag ID, after receiving the first BGP message, the second network device may first determine, by using the route type, that the first entry is the ARP entry. If it is determined that the backup_id (or the ESI) matches a backup_id (or an ESI) of a port on the second network device, and the Ethernet tag ID matches VLAN information of the port on the second network device, the second network device may obtain port information of the port, generate the second entry based on the MAC address, the IP address, the VLAN information, and the port information, and store the second entry. It should be noted that, while storing the second entry, the second network device may further mark that the second entry is generated based on the ARP entry backup route indicated by the first BGP message.

It should be noted that, for an entry corresponding to another service, for example, a NDP entry, an IGMP entry, an IGMP SNP entry, or a BAS entry, refer to the description of the foregoing embodiment for an entry backup manner thereof.

It should be noted that, if the first entry on the first network device (for example, the DHCP SNP entry or the ARP entry) is updated, for example, a lease of the DHCP SNP entry changes, the first network device may back up information about the updated entry on the first network device to the second network device by using another BGP message again, to ensure that the information of the updated first entry is stored in the second network device. In addition, when the first network device receives a go-offline request sent by user equipment, or when duration of generating the DHCP SNP entry exceeds a valid lease indicated in the lease information, the first network device may further delete the first entry stored in the first network device, and indicate, by using yet another BGP message, the second network device to also delete the first entry stored in the second network device, to release resources on the network device.

In addition, in a manner of adding an extended community attribute to a common BGP route, a BGP message that includes the newly added extended community attribute may be sent between network devices, to implement entry backup between the network devices. The method provided in this embodiment may be applied to the non-EVPN scenario.

FIG. 12 is a schematic flowchart of another method for implementing entry backup according to an embodiment of this application. When a first network device backs up an entry to a second network device, referring to FIG. 12, the method may include, for example, the following step 1201 to step 1204.

Step 1201: A first network device generates a first BGP message, where the first BGP message includes NLRI and a first extended community attribute, the first extended community attribute is used to carry first entry information, and the first entry information is information about a first entry stored in the first network device.

It may be understood that, when user equipment enables, by using the first network device, a protocol corresponding to a service to go online, the first network device may generate a first entry corresponding to the service, to guide normal provision of the service. For example, when the user equipment enables, by using the first network device, an address resolution protocol ARP corresponding to an ARP service to go online, the first network device may generate an ARP entry, to guide normal provision of the ARP service.

The first entry may be specifically a DHCP SNP entry, the ARP entry, an NDP entry, an IGMP entry, an IGMP SNP entry, a BAS entry, or the like.

The first entry information is the information about the first entry, and may specifically include different content based on different service types to which the first entry belongs. For example, when the first entry is the DHCP SNP entry, the first entry information may include at least an IP address, a MAC address, a backup_id, and lease information, and may further include VLAN information. For another example, when the first entry is the ARP entry, the first entry information may include at least an IP address, a backup_id, and a MAC address, and may further include VLAN information.

It should be noted that, in a multi-device backup scenario, the first network device that generates the first entry may be used as an active network device. To effectively improve network reliability in a multi-device backup structure, the active network device may back up the first entry information corresponding to the first entry to another standby network device. In this embodiment of this application, an example in which the first network device backs up the first entry information to the second network device is used for description. For implementations of backing up the first entry information to the another standby network device, refer to implementations and related descriptions in the embodiments of this application.

In some specific implementations, before step 1201 is implemented, pre-configuration may be performed on the network. For example, according to a first aspect, the network is configured to support an IGP, an MPLS protocol, or a BGP, to enable a BGP route to be reachable. Active and standby network devices can be directly connected, to establish a BGP peer, or a BGP peer can be established between a route reflector RR and all active and standby network devices through transit of the RR. According to a second aspect, a same interface identifier is configured for interfaces that are used by the active and standby network devices to connect to the switch or the OLT, and for the non-EVPN network, the same interface identifier may be a newly configured backup_id for the active and standby network devices. According to a third aspect, an interface, of each active/standby network device, connected to the switch or the OLT is configured to access a corresponding network and a corresponding service is enabled. For example, in a Layer 2 scenario in the non-EVPN network, an interface, of each active/standby network device, connected to the switch or the OLT is configured to access a VLAN interface, a virtual switch interface (VSI), or a bridge-domain (BD) interface, and a corresponding service is enabled on the interface. For another example, in a Layer 3 non-EVPN scenario, an interface, of each active/standby network device, connected to the switch or the OLT is configured to access a public network IP interface or an L3VPN interface, a corresponding service relay is configured on the interface to forward a service packet to a remote server, and a corresponding service is enabled on the interface.

It may be understood that, a new extended community attribute may be extended on a BGP route supported by the network device, so that backup between network devices of different vendors can be implemented by using a BGP message corresponding to a BGP route supported by all vendors. In a specific implementation, before step 1201, the BGP route corresponding to the BGP message that includes the newly added extended community attribute may be enabled on each active/standby network device. In this way, each active/standby network device may perform operations such as receiving, sending, and processing on the BGP message.

In a specific implementation, when generating the first entry on the first network device that enables the BGP route, the first network device may generate, for the first entry, the first BGP message that includes the NLRI and the first extended community attribute, where the first extended community attribute is used to carry the information about the first entry (namely, the first entry information).

In an example, the first network device may convert the IP address in the first entry into a prefix route of the BGP route, which is carried in the NLRI of the first BGP message, and make the backup_id in the first entry be carried in a newly added first extended community attribute of the first BGP message. It may be understood that, when the first entry includes the VLAN information, both the VLAN information and the backup_id may be carried in the first extended community attribute. As shown in FIG. 13, fields included in the Backup_Community and corresponding meanings are as follows: (1) an extended community attribute type (Extend-Community type) field, which is used to indicate a type of a newly added extended community attribute in a non-VPN scenario; (2) an extended community attribute sub-type (Extend-Community sub-type) field, which is used to indicate a sub-type of the extended community attribute; (3) a backup_id field, which is used to identify an interface identifier configured for an interface corresponding to the first entry; (4) an outer VLAN (Outer vlan) field, which is used to indicate outer VLAN information corresponding to the first entry; and (5) an inner VLAN field, which is used to indicate inner VLAN information corresponding to the first entry.

It should be noted that, when the first entry includes the VLAN information, the VLAN information and the backup_id may be carried in different extended community attributes.

In this example, the first BGP message may further include a second extended community attribute, and the second extended community attribute MAC_Community is used to carry the MAC address in the first entry information. As shown in FIG. 14, fields included in the MAC_Community and corresponding meanings are as follows: (1) an extended community attribute type (Extend-Community type) field, which is used to indicate a type of a newly added extended community attribute in a non-VPN scenario; (2) an extended community attribute sub-type (Extend-Community sub-type) field, which is used to indicate a sub-type of the extended community attribute; and (3) a MAC address field, which is used to indicate the MAC address of the first entry.

It should be noted that, for the first entry information that further includes other content, the first BGP message may further include another extended community attribute, which is used to carry other information in the first entry. For example, if the first entry is the DHCP SNP entry, the first BGP message may further include a third extended community attribute Lease_Community shown in FIG. 8, which is used to carry the lease information in the DHCP SNP entry.

In step 1201, the first network device generates the first BGP message, and adds the information about the first entry to the newly added extended community attribute. Because the second network device also supports a common BGP route, and can identify the first BGP message. In step 1201, a data basis is provided for the first network device to subsequently back up the first entry to the second network device by using the first BGP message.

Step 1202: The first network device sends the first BGP message to the second network device.

Step 1203: The second network device receives the first BGP message sent by the first network device.

In a specific implementation, in one case, the first network device and the second network device each are connected to a route reflector, to establish a BGP peer. In this case, the first network device sends the first BGP message to the route reflector, and the route reflector directly forwards the received first BGP message to the second network device. In another case, if the first network device and the second network device are directly connected, to establish a BGP peer, the first network device directly sends the first BGP message to the second network device.

It may be understood that because the second network device supports the common BGP route, the second network device may receive and identify the first BGP message, and may further perform another processing operation on the first entry information carried in the first BGP message. In this way, it is possible to back up the first entry on the second network device.

Step 1204: The second network device obtains a second entry based on the first BGP message, and stores information about the second entry, where the information about the second entry includes the first entry information, to back up the first entry on the second network device.

In a specific implementation, after receiving the first BGP message, the second network device may obtain the NLRI and the first extended community attribute by parsing the first BGP message. In this case, the second network device processes the first BGP message, for example, obtaining the second entry based on the IP address carried in the NLRI and the first entry information carried in the first extended community attribute, and storing the second entry, where information about the second entry includes the first entry information, and the second entry is a backup entry of the first entry on the second network device.

A process in which the second network device processes the first BGP message may specifically include interface matching and second entry generation. In the non-EVPN scenario, the second network device may perform interface matching based on the backup_id (or the backup_id and the VLAN information) carried in the first extended community attribute of the received first BGP message. A specific interface matching process may include: determining whether the backup_id matches a backup_id of a port on the second network device, and determining whether an Ethernet tag ID matches VLAN information of a port on the second network device. If the matching succeeds, the second network device may obtain port information of the port, obtain the IP address in the first entry based on the port information of the port and the prefix route carried in the NLRI, and generate the second entry based on information such as the VLAN information carried in the first extended community attribute and the MAC address carried in the second extended community attribute.

It should be noted that because the first network device is not explicitly set as the active network device and the second network device is not explicitly set as the standby network device, after the second network device obtains and stores the second entry, and completes backup of the first entry generated by the first network device, the second network device may further mark that the second entry is generated based on the entry backup route. In this way, a problem, of wasting network resources and easily appearing an error of entry backup, caused by a fact that the second network device reversely backs up the second entry to the first network device and another standby network device, and therefore a to-be-backed-up entry is continuously backed up between the active and standby network devices can be avoided.

In some specific implementations, when the first entry stored in the first network device is updated to an entry 5, this embodiment of this application may further include a process of updating a backed-up entry. In a specific implementation, this embodiment may include: S31: The first network device generates a BGP message 2, where the BGP message 2 includes entry 5 information, and the entry 5 information is information about the entry 5 stored in the first network device; S32: The first network device sends the BGP message 2 to the second network device, where the BGP message 2 is used to advertise an entry backup route to the second network device; S33: The second network device receives the BGP message 2; and S34: The second network device obtains an entry 6 based on the BGP message 2, where information about the entry 6 includes the entry 5 information. In this way, consistency between the entry backed up on the second network device and the entry stored in the first network device is ensured, so that the second network device can accurately provide a corresponding business service after an active/standby switchover, thereby ensuring network reliability.

In some other specific implementations, when the first network device receives a go-offline request sent by the user equipment, or for the DHCP SNP entry, duration of generating the DHCP SNP entry exceeds a valid lease indicated in the lease information, this embodiment of this application may further include a process of deleting a corresponding entry on the active/standby network device. In a specific implementation, this embodiment may include: S41: The first network device deletes the first entry or the entry 5 currently stored in the first network device, and generates a second BGP message, where the second BGP message is used to advertise a route for withdrawing the backup entry to the second network device; S42: The first network device sends the second BGP message to the second network device; S43: The second network device receives the second BGP message; and S44: The second network device deletes, based on the second BGP message, the second entry or the entry 6 currently stored in the second network device. In this way, a service corresponding to the entry is brought offline, and resources on the network device are released.

The second BGP message is used to: when the generated duration exceeds the valid lease indicated in the lease information, or when the first network device receives the go-offline request sent by the user equipment, indicate to advertise another newly defined route for withdrawing the backup entry to the second network device.

It should be noted that, for a process in which service entries corresponding to various service types are backed up by using the method provided in this embodiment of this application, refer to related descriptions in the following instances.

It can be learned, in the method provided in this embodiment of this application, an extended community attribute is added to a BGP route. In the generated first BGP message, the newly added extended community attribute carries to-be-backed-up first entry information. A common BGP route is applicable to network devices of various vendors. To be specific, network devices of different vendors may perform operations such as receiving, sending, and identifying the first BGP message of the newly added extended community attribute, thereby overcoming a problem that entry backup between the network devices of the different vendors cannot be implemented by using proprietary protocols of the vendors to perform entry backup. The extended community attribute is added to the common BGP route that can be universally used by the network devices of the various vendors, so that entry backup can be performed easily and conveniently between the network devices of the different vendors. Therefore, reliability of a network that includes the network devices of the different vendors can be improved in a multi-device backup manner.

In addition, in the method for implementing entry backup shown in FIG. 12, the second network device or the third network device in the network may also enable the entry backup route, and the BGP message corresponding to the entry backup route may be sent between network devices, to implement entry backup between the network devices, that is, entry backup may be implemented by performing step 301 to step 304.

It should be noted that if each active/standby network device in the network supports the entry backup manners corresponding to step 301 to step 304 and step 1201 to step 1204, this embodiment of this application may further include an operation of selecting a backup manner on the first network device based on an actual requirement. If the first network device determines to implement entry backup by using a manner of the entry backup route, entry backup may be implemented by using step 301 to step 304. If the first network device determines to implement entry backup by adding the extended community attribute to the BGP route, the first network device may implement entry backup by using step 1201 to step 1204. It should be noted that, when entries of different services have backup requirements, the first network device may also back up different service entries to the standby network device by using a same entry backup manner or different entry backup manners at the same time.

To make the embodiment corresponding to FIG. 12 clearer, the following describes, with reference to the accompanying drawings, a process of backing up two specific service entries in the non-EVPN scenario by using the method provided in FIG. 12.

For the DHCP SNP service, the first entry that is generated on the first network device and that is to be backed up to the second network device is the DHCP SNP entry. The first entry information includes at least the IP address, the MAC address, the backup_id, and the lease information.

In a specific implementation, the first network device may convert the IP address in the first entry into the prefix route, which is carried in the NLRI, make the backup_id (or the backup_id and the VLAN information) be carried in the Backup_Community shown in FIG. 13, make the MAC address be carried in the MAC_Community shown in FIG. 14, and make the lease information be carried in the Lease_Community shown in FIG. 8, to generate the first BGP message. Then, the first network device sends the first BGP message to the second network device. After receiving the first BGP message, the second network device may obtain the NLRI, the Backup_Community, the MAC_Community, and the Lease_Community by parsing the first BGP message. In this case, the second network device first performs interface matching based on the backup_id (or the backup_id and the VLAN information) carried in the Backup_Community. A specific interface matching process may include: determining whether the backup_id matches a backup_id of a port on the second network device (or determine whether the backup_id matches a backup_id of a port on the second network device, and determine whether an Ethernet tag ID matches VLAN information of a port on the second network device). If the matching succeeds, the second network device may obtain port information of the port, obtain the IP address in the first entry based on the port information and the prefix route carried in the NLRI, generate the second entry based on the VLAN information carried in the Backup_Community, the MAC address carried in the MAC_Community, and the lease information carried in the Lease_Community, and store the second entry. It should be noted that, while storing the second entry, the second network device may further mark that the second entry is generated based on the DHCP SNP entry backup route indicated by the first BGP message.

For the ARP service, the first entry that is generated on the first network device and that is to be backed up to the second network device is the ARP entry. The first entry information includes at least the IP address, the MAC address, and the backup_id.

In a specific implementation, the first network device may convert the IP address in the first entry into the prefix route, which is carried in the NLRI, make the backup_id (or the backup_id and the VLAN information) be carried in the Backup_Community shown in FIG. 13, and make the MAC address be carried in the MAC_Community shown in FIG. 14. Then, the first network device sends the first BGP message to the second network device. After receiving the first BGP message, the second network device may obtain the NLRI, the Backup_Community, and the MAC_Community by parsing the first BGP message. In this case, the second network device first performs interface matching based on the backup_id (or the backup_id and the VLAN information) carried in the Backup_Community. A specific interface matching process may include: determining whether the backup_id matches a backup_id of a port on the second network device (or determine whether the backup_id matches a backup_id of a port on the second network device, and determine whether an Ethernet tag ID matches VLAN information of a port on the second network device). If the matching succeeds, the second network device may obtain port information of the port, obtain the IP address in the first entry based on the port information and the prefix route carried in the NLRI, generate the second entry based on the VLAN information carried in the Backup_Community and the MAC address carried in the MAC_Community, and store the second entry. It should be noted that, while storing the second entry, the second network device may further mark that the second entry is generated based on the DHCP SNP entry backup route indicated by the first BGP message.

It should be noted that, if the first entry on the first network device (for example, the DHCP SNP entry or the ARP entry) is updated, for example, a lease of the DHCP SNP entry changes, the first network device may back up information about the updated entry on the first network device to the second network device by using another BGP message again, to ensure that the information of the updated first entry is stored in the second network device. In addition, when the first network device receives the go-offline request sent by the user equipment, or when duration of generating the DHCP SNP entry exceeds a valid lease indicated in the lease information, the first network device may further delete the first entry stored in the first network device, and indicate, by using yet another BGP message, the second network device to also delete the first entry stored in the second network device, to release resources on the network device.

Figure 15:
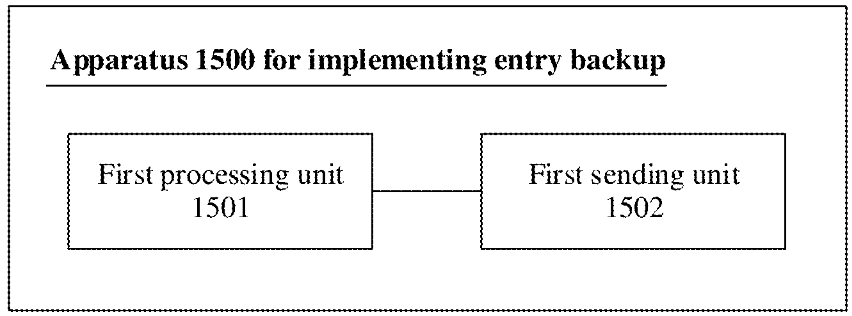
FIG. 15 is a schematic structural diagram of an apparatus for implementing entry backup according to an embodiment of this application.

FIG. 15 is a schematic structural diagram of an apparatus for implementing entry backup according to an embodiment of this application. The apparatus is applied to a first network device. The apparatus 1500 includes a first processing unit 1501 and a first sending unit 1502.

The first processing unit 1501 is configured to generate a first BGP message, where the first BGP message includes first entry information, and the first entry information is information about a first entry stored in the first network device.

The first sending unit 1502 is configured to send the first BGP message to a second network device, where the first BGP message is used to advertise an entry backup route to the second network device, to enable the second network device to obtain a second entry based on the first BGP message, information about the second entry includes the first entry information, and the second entry is a backup entry of the first entry.

It may be understood that the first BGP message includes a route type field, and the route type field indicates that a type of a route advertised by the first BGP message is the entry backup route.

In a specific implementation, the first BGP message includes the EVPN NLRI is used to carry an ESI, the ESI is used by the second network device to obtain port information, and the second entry includes the port information.

In another specific implementation, the first BGP message includes first NLRI and a newly defined SAFI, the SAFI indicates that an address family of the first BGP message is a BGP backup address family, the first NLRI is used to carry a backup_id, the backup_id is used by the second network device to obtain port information, and the second entry includes the port information.

In still another specific implementation, the first entry is a DHCP SNP entry, and the first entry information includes an IP address, a MAC address, and lease information. The first BGP message further includes a first extended community attribute. The NLRI includes the IP address and the MAC address, and the first extended community attribute includes the lease information.

In yet another specific implementation, the apparatus 1500 further includes a second processing unit and a second sending unit. The second processing unit is configured to: when duration of generating the first entry exceeds a valid lease indicated in the lease information, delete the first entry, and generate a second BGP message, where the second BGP message is used to advertise a route for withdrawing the backup entry to the second network device; and the second sending unit is configured to send the second BGP message to the second network device, where the second BGP message is used to indicate the second network device to delete the second entry.

In still another specific implementation, the apparatus 1500 further includes a third processing unit and a third sending unit. The third processing unit is configured to: when the first network device receives a go-offline request sent by user equipment, delete the first entry, and generate a third BGP message, where the third BGP message is used to advertise a route for withdrawing the backup entry to the second network device; and the third sending unit, configured to send the third BGP message to the second network device, where the third BGP message is used to indicate the second network device to delete the second entry.

In still another specific implementation, the apparatus 1500 further includes a fourth processing unit and a fourth sending unit. The fourth processing unit is configured to generate a fourth BGP message, where the fourth BGP message includes a second extended community attribute, and the second extended community attribute includes the first entry information; and the fourth sending unit is configured to send the fourth BGP message to a third network device, to enable the third network device to obtain a third entry based on the fourth BGP message, where information about the third entry includes the first entry information, and the third entry is a backup entry of the first entry.

In another specific implementation, the fourth BGP message further includes a backup_id, the second extended community attribute includes the backup_id, the backup_id is used by the second network device to obtain port information, and the second entry includes the port information.

In still another specific implementation, the first entry information includes a MAC address, the fourth BGP message further includes a third extended community attribute, and the third extended community attribute includes the MAC address.

In another specific implementation, the first entry and the third entry are DHCP SNP entries, and the first entry information further includes lease information. In this case, the fourth BGP message further includes a fourth extended community attribute, and the fourth extended community attribute includes the lease information.

In still another specific implementation, the first entry is an ARP entry, a NDP entry, an IGMP entry, an IGMP SNP entry, or a BAS entry.

It should be noted that the apparatus 1500 is an apparatus corresponding to the method provided in the embodiment shown in FIG. 3. Therefore, for various possible implementations and technical effects of the apparatus 1500, refer to related descriptions in the embodiment corresponding to FIG. 3.

Figure 16:
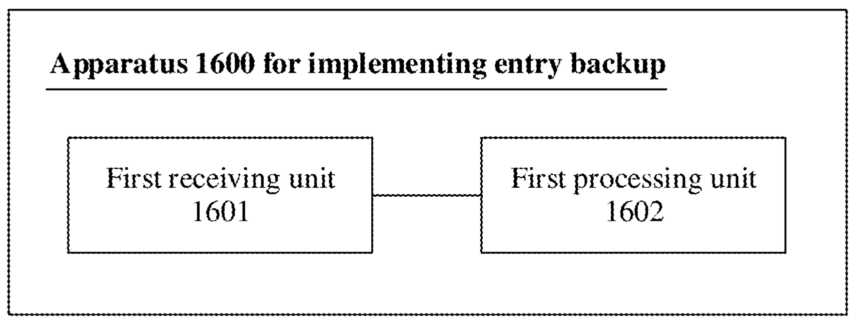
FIG. 16 is a schematic structural diagram of still another apparatus for implementing entry backup according to an embodiment of this application.

FIG. 16 is a schematic structural diagram of another apparatus for implementing entry backup according to an embodiment of this application. The apparatus is applied to a second network device. The apparatus 1600 includes a first receiving unit 1601 and a first processing unit 1602.

The first receiving unit 1601 is configured to receive a first BGP message sent by a first network device, where the first BGP message includes first entry information, the first entry information is information about a first entry stored in the first network device, and the first BGP message is used to advertise an entry backup route to the second network device.

The first processing unit 1602 is configured to: obtain a second entry based on the first BGP message, and store information about the second entry, where the second entry is a backup entry of the first entry, and the information about the second entry includes the first entry information.

It may be understood that the first BGP message includes a route type field, and the route type field indicates that a type of a route advertised by the first BGP message is the entry backup route.

In a specific implementation, the first BGP message includes the EVPN NLRI is used to carry an ESI, and the apparatus further includes: a second processing unit, configured to obtain port information based on the ESI, where the second entry includes the port information.

In another specific implementation, the first BGP message includes first NLRI and a newly defined SAFI, the SAFI indicates that an address family of the first BGP message is a BGP backup address family, the first NLRI is used to carry a backup_id, and the apparatus further includes: a third processing unit, configured to obtain port information based on the backup_id, where the second entry includes the port information.

In an example, the first entry is a DHCP SNP entry, the first entry information includes an IP address, a MAC address, and lease information, and the first BGP message further includes a first extended community attribute. The first processing unit 1601 is specifically configured to obtain the second entry based on the IP address and the MAC address that are in the NLRI and the lease information included in the first extended community attribute. In this case, the apparatus further includes: a second receiving unit, configured to: when duration of generating the first entry exceeds a valid lease indicated in the lease information, receive a second BGP message sent by the first network device, where the second BGP message is used to advertise a route for withdrawing the backup entry to the second network device; and delete the second entry based on the second BGP message.

In still another specific implementation, the apparatus 1600 further includes: a third receiving unit, configured to: when the first network device receives a go-offline request sent by user equipment, receive a third BGP message sent by the first network device, where the third BGP message is used to advertise a route for withdrawing the backup entry to the second network device; and delete the second entry based on the third BGP message.

In another specific implementation, the apparatus 1600 further includes: a fourth receiving unit, configured to receive a fourth BGP message sent by the first network device, where the fourth BGP message includes a second extended community attribute, and the second extended community attribute includes the first entry information; and a fourth processing unit, configured to obtain a third entry based on the fourth BGP message, where information about the third entry includes the first entry information, and the third entry is a backup entry of the first entry.

In still another specific implementation, the fourth BGP message further includes a backup_id, the second extended community attribute includes the backup_id, and the apparatus 1600 further includes: a fifth processing unit, configured to obtain port information based on the backup_id, where the second entry includes the port information.

It should be understood that the first entry information includes a MAC address, the fourth BGP message further includes a third extended community attribute, and the third extended community attribute includes the MAC address.

In an example, the first entry is a DHCP SNP entry, and the first entry information further includes lease information. In this case, the fourth BGP message further includes a fourth extended community attribute, and the fourth extended community attribute includes the lease information.

In yet another specific implementation, the first entry is an ARP entry, a NDP entry, an IGMP entry, an IGMP SNP entry, or a BAS entry.

It should be noted that the apparatus 1600 is an apparatus corresponding to the method provided in the embodiment shown in FIG. 3. Therefore, for various possible implementations and technical effects of the apparatus 1600, refer to descriptions of the method provided in the embodiment shown in FIG. 3.

Figure 17:
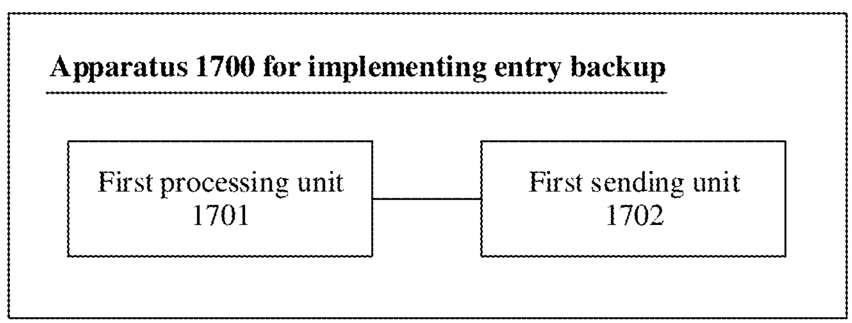
FIG. 17 is a schematic structural diagram of another apparatus for implementing entry backup according to an embodiment of this application.

FIG. 17 is a schematic structural diagram of an apparatus for implementing entry backup according to an embodiment of this application. The apparatus is applied to a first network device. The apparatus 1700 includes a first processing unit 1701 and a first sending unit 1702.

The first processing unit 1701 is configured to generate a first BGP message, where the first BGP message includes NLRI and a first extended community attribute, the first extended community attribute includes first entry information, and the first entry information is information about a first entry stored in the first network device.

The first sending unit 1702 is configured to send the first BGP message to a second network device, to enable the second network device to obtain a second entry based on the first BGP message, where information about the second entry includes the first entry information, and the second entry is a backup entry of the first entry.

In a specific implementation, the first BGP message includes a backup_id, the first extended community attribute includes the backup_id, the backup_id is used by the second network device to obtain port information, and the second entry includes the port information.

In another specific implementation, the first entry information includes a MAC address, the first BGP message further includes a second extended community attribute, and the second extended community attribute includes the MAC address.

In an example, the first entry and the second entry are DHCP SNP entries, and the first entry information further includes lease information. In this case, the first BGP message further includes a third extended community attribute, and the third extended community attribute includes the lease information.

In still another specific implementation, the first entry is an ARP entry, a NDP entry, an IGMP entry, an IGMP SNP entry, or a BAS entry.

In yet another specific implementation, the apparatus 1700 further includes: a second processing unit, configured to: when the first network device receives a go-offline request sent by user equipment, or when duration of generating the first entry exceeds a valid lease indicated in the lease information in the first entry information, delete the first entry, and generate a second BGP message, where the second BGP message is used to advertise a route for withdrawing the backup entry to the second network device; and a second sending unit, configured to send the second BGP message to the second network device, where the second BGP message is used to indicate the second network device to delete the second entry.

It should be noted that the apparatus 1700 is an apparatus corresponding to the method provided in the embodiment shown in FIG. 12. Therefore, for various possible implementations and technical effects of the apparatus 1700, refer to descriptions of the method provided in the embodiment shown in FIG. 12.

Figure 18:
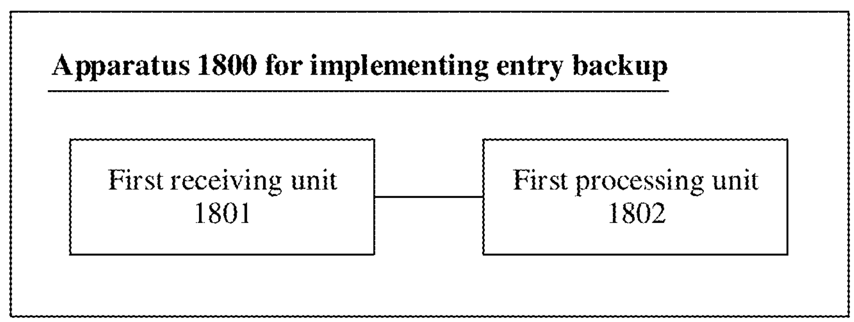
FIG. 18 is a schematic structural diagram of yet another apparatus for implementing entry backup according to an embodiment of this application.

FIG. 18 shows another apparatus for implementing entry backup according to an embodiment of this application. The apparatus is applied to a second network device. The apparatus 1800 includes a first receiving unit 1801 and a first processing unit 1802.

The first receiving unit 1801 is configured to receive a first BGP message sent by a first network device, where the first BGP message includes NLRI and a first extended community attribute, the first extended community attribute includes first entry information, and the first entry information is information about a first entry stored in the first network device.

The first processing unit 1802 is configured to obtain a second entry based on the first BGP message, and store information about the second entry, where the information about the second entry includes the first entry information, to back up the first entry on the second network device, and the second entry is a backup entry of the first entry.

In a specific implementation, the first BGP message includes a backup_id, the first extended community attribute includes the backup_id, and the apparatus 1800 further includes: a second processing unit, configured to obtain port information based on the backup_id, where the second entry includes the port information.

It should be understood that the first entry information includes a MAC address, the first BGP message further includes a second extended community attribute, and the second extended community attribute includes the MAC address.

In an example, the first entry is a DHCP SNP entry, and the first entry information further includes lease information. In this case, the first BGP message further includes a third extended community attribute, and the third extended community attribute includes the lease information.

In yet another specific implementation, the first entry is an ARP entry, a NDP entry, an IGMP entry, an IGMP SNP entry, or a BAS entry.

With reference to still another specific implementation of the eighth aspect, the apparatus 1800 further includes: a second receiving unit, configured to: when the first network device receives a go-offline request sent by user equipment, or when duration of generating the first entry exceeds a valid lease indicated in the lease information in the first entry information, receive the second BGP message sent by the first network device, where the second BGP message is used by the first network device to advertise a route for withdrawing the backup entry to the second network device; and a third processing unit, configured to delete the second entry based on the second BGP message.

It should be noted that the apparatus 1800 is an apparatus corresponding to the method provided in the embodiment shown in FIG. 12. Therefore, for various possible implementations and technical effects of the apparatus 1800, refer to descriptions of the method provided in the embodiment shown in FIG. 12.

Figure 19:
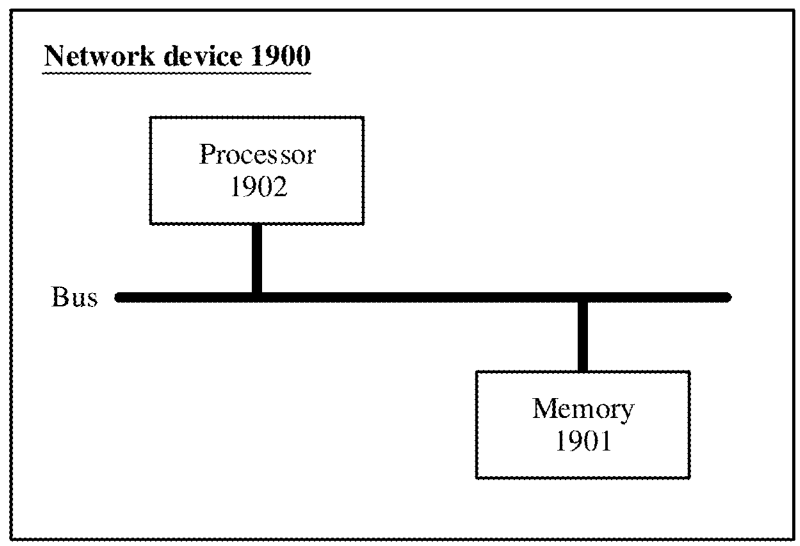
FIG. 19 is a schematic structural diagram of a network device according to an embodiment of this application.

In addition, an embodiment of this application further provides a network device 1900. As shown in FIG. 19, the network device 1900 includes a memory 1901 and a processor 1902. The memory 1901 is configured to store program code. The processor 1902 is configured to run instructions in the program code, to enable the network device 1900 to perform the method for implementing entry backup in any one of the foregoing implementations in FIG. 3 or FIG. 12.

In this application, the network device may be a device such as a switch or a router. Alternatively, the network device may be a switching network board or a switching chip in a device such as a router or a switch. The network device may refer to one device, or may include a plurality of devices. For example, the network device includes a plurality of switching chips.

The processor 1902 may be a central processing unit (CPU), a network processor (NP), or a combination of a CPU and an NP. Alternatively, the processor 1902 may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 1902 may be one processor, or may include a plurality of processors. The memory 1901 may include a volatile memory, for example, a random access memory (RAM), or the memory 1901 may include a non-volatile memory, for example, a read-only memory (ROM), a flash memory, a hard disk drive (HDD), or a solid-state drive (SSD). Alternatively, the memory 1901 may include a combination of the foregoing types of memories. The memory 1901 may refer to one memory, or may include a plurality of memories. In a specific implementation, the memory 1901 stores a computer-readable instruction, and the computer-readable instruction includes a plurality of software modules, for example, a sending module, a processing module, and a receiving module. After executing each software module, the processor 1902 may perform a corresponding operation based on an indication of each software module. In this embodiment, an operation performed by a software module is actually the operation performed by the processor 1902 based on the indication of the software module. After executing the computer-readable instruction in the memory 1901, the processor 1902 may perform, based on indications of the computer-readable instruction, all operations that may be performed by the network device 1900.

In addition, an embodiment of this application further provides a computer program product. When the computer program product runs on a computer, the computer is enabled to perform the load sharing method in any one of the foregoing implementations in FIG. 3 or FIG. 12.

In addition, an embodiment of this application further provides a computer-readable storage medium. The computer-readable storage medium stores instructions. When the instructions are run on a computer, the computer is enabled to perform the load sharing method in any one of the foregoing implementations in FIG. 3 or FIG. 12.

It should be noted that, in this embodiment of this application, "active network device" and "master network device" indicate a same meaning, and may be used interchangeably, and "standby network device" and "backup network device" also indicate a same meaning, and may be used interchangeably.

Ordinal numbers such as "first", "second", "third", and "fourth" mentioned in this embodiment of this application are merely used for name identification, used to distinguish different objects, and do not represent a sequence.

From the foregoing descriptions of the implementations, a person skilled in the art may clearly understand that some or all steps of the methods in the embodiments may be implemented by software in addition to a universal hardware platform. Based on such an understanding, the technical solutions of this application may be implemented in a form of a software product. The software product may be stored in a storage medium, such as a ROM/RAM, a magnetic disk, or an optical disc, and includes several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment. The described device and apparatus embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The foregoing descriptions are merely example implementations of this application, but are not intended to limit the protection scope of this application.

The invention claimed is:

1. A method for implementing entry backup, comprising:

generating, by a first network device, a first border gateway protocol (BGP) message, wherein the first BGP message comprises first entry information, and the first entry information comprises information about a first entry stored in the first network device; and sending, by the first network device, the first BGP message to a second network device, wherein the first BGP message advertises an entry backup route to the second network device to enable the second network device to obtain a second entry based on the first BGP message, wherein information about the second entry comprises the first entry information, and the second entry is a backup entry of the first entry, wherein the first BGP message comprises a route type field, and the route type field indicates that a type of a route advertised by the first BGP message is the entry backup route.

2. The method according to claim 1, wherein the first BGP message comprises Ethernet virtual private network network layer reachability information (EVPN NLRI), the EVPN NLRI carries an Ethernet segment identifier (ESI).

3. The method according to claim 1, wherein the first BGP message comprises first network layer reachability information (NLRI), and a subsequent address family identifier (SAFI), the SAFI indicates that an address family of the first BGP message is a BGP backup address family, and the first NLRI carries a backup interface identifier (backup_id).

4. The method according to claim 1, further comprising: sending, by the first network device, a second BGP message to the second network device, wherein the second BGP message advertises a route for withdrawing the backup entry and indicates the second network device to delete the second entry.

5. The method according to claim 1, further comprising: sending, by the first network device to a third network device, a fourth BGP message comprising the first entry information to enable the third network device to obtain a third entry based on the fourth BGP message, wherein information about the third entry comprises the first entry information, and the third entry is a backup entry of the first entry.

6. The method according to claim 1, wherein the first entry is an address resolution protocol (ARP) entry, a neighbor discovery protocol (NDP) entry, an internet group management protocol (IGMP) entry, an internet group management protocol snooping (IGMP SNP) entry, a dynamic host configuration protocol snooping (DHCP SNP) entry, or a broadband access server (BAS) entry.

7. A second network device, comprises a memory and a processor, wherein the memory is configured to store program code; and the processor is configured to run instructions in the program code, to cause the second network device to perform operations comprising:

receiving a first BGP message sent by a first network device, wherein the first BGP message comprises first entry information, and the first entry information comprises information about a first entry stored in the first network device; and obtaining a second entry based on the first BGP message and storing information about the second entry, wherein the second entry is a backup entry of the first entry, and the information about the second entry comprises the first entry information, wherein the first BGP message comprises a route type field, and the route type field indicates that a type of a route advertised by the first BGP message is an entry backup route.

8. The second network device according to claim 7, wherein the first BGP message carries an Ethernet segment identifier (ESI) and the operations further comprise:

obtaining port information based on the ESI, wherein the second entry comprises the port information.

9. The second network device according to claim 7, wherein the first BGP message comprises first network layer reachability information (NLRI), and a subsequent address family identifier (SAFI), wherein the SAFI indicates that an address family of the first BGP message is a BGP backup address family, and the first NLRI carries a backup interface identifier (backup_id), and the operations further comprise:

obtaining port information based on the backup_id, wherein the second entry comprises the port information.

10. The second network device according to claim 7, wherein the operations further comprise:

receiving a second BGP message sent by the first network device, wherein the second BGP message advertises a route for withdrawing the backup entry to the second network device; and deleting the second entry based on the second BGP message.

11. The second network device according to claim 7, wherein the first entry is an address resolution protocol (ARP) entry, a neighbor discovery protocol (NDP) entry, an internet group management protocol (IGMP) entry, an internet group management protocol snooping (IGMP SNP) entry, a dynamic host configuration protocol snooping (DHCP SNP) entry, or a broadband access server (BAS) entry.

12. A first network device comprising a memory and a processor, wherein the memory is configured to store program code; and the processor is configured to run instructions in the program code, to cause the first network device to perform operations comprising:

generating a first border gateway protocol (BGP) message, wherein the first BGP message comprises first entry information, and the first entry information comprises information about a first entry stored in the first network device, and wherein the first BGP message comprises a route type field, and the route type field indicates that a type of a route advertised by the first BGP message is the entry backup route; and sending the first BGP message to a second network device, wherein the first BGP message advertises an entry backup route to the second network device to enable the second network device to obtain a second entry based on the first BGP message, wherein information about the second entry comprises the first entry information, and the second entry is a backup entry of the first entry.

13. The first network device according to claim 12, wherein the first BGP message comprises Ethernet virtual private network network layer reachability information (EVPN NLRI), the EVPN NLRI carries an Ethernet segment identifier (ESI).

14. The first network device according to claim 12, wherein the first BGP message comprises first network layer reachability information (NLRI) and a subsequent address family identifier (SAFI), the SAFI indicates that an address family of the first BGP message is a BGP backup address family, and the first NLRI carries a backup interface identifier (backup_id).

15. The first network device according to claim 12, wherein the operations further comprise:

sending a second BGP message to the second network device, wherein the second BGP message advertises a route for withdrawing the backup entry and indicates the second network device to delete the second entry.

16. The first network device according to claim 12, wherein the operations further comprise:

sending, to a third network device, a fourth BGP message comprising the first entry information to enable the third network device to obtain a third entry based on the fourth BGP message, wherein information about the third entry comprises the first entry information, and the third entry is a backup entry of the first entry.

17. The device according to claim 12, wherein the first entry is an address resolution protocol (ARP) entry, a neighbor discovery protocol (NDP) entry, an internet group management protocol (IGMP) entry, an internet group management protocol snooping (IGMP SNP) entry, a dynamic host configuration protocol snooping (DHCP SNP) entry, or a broadband access server (BAS) entry.

* * * * *